INVENTORS
OSCAR C. LEVY &
GEORGE A. GROTH
BY
ATTORNEYS

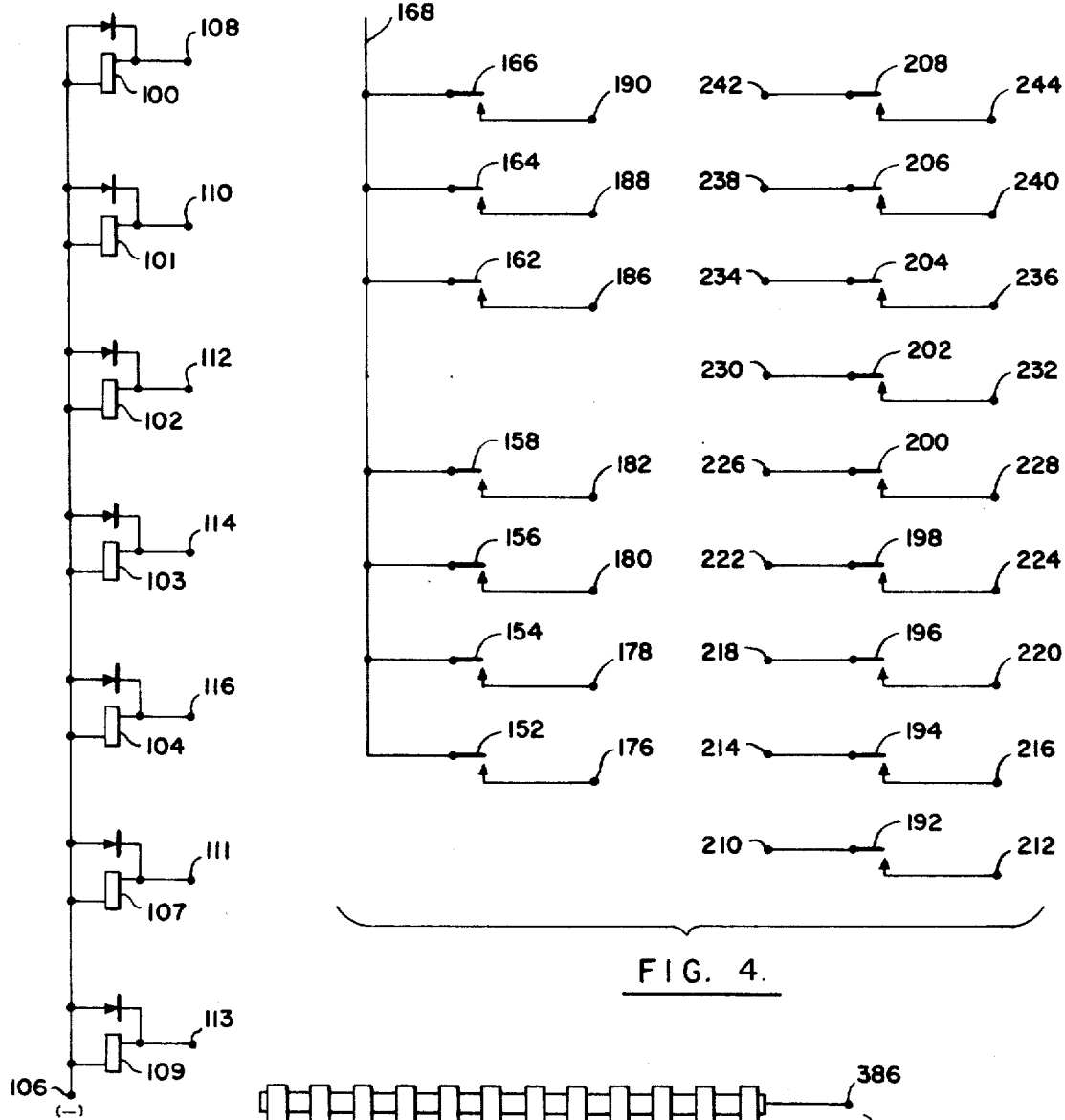
FIG. 3.
FIG. 4.
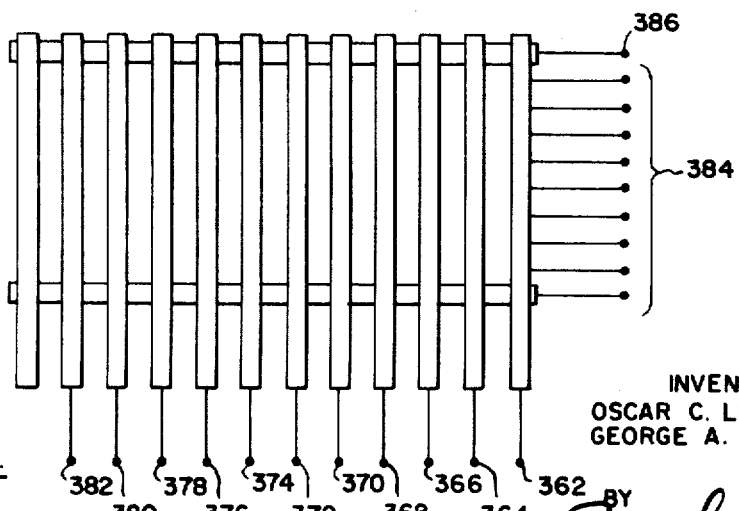
FIG. 6.
INVENTORS
OSCAR C. LEVY &
GEORGE A. GROTH
ATTORNEYS

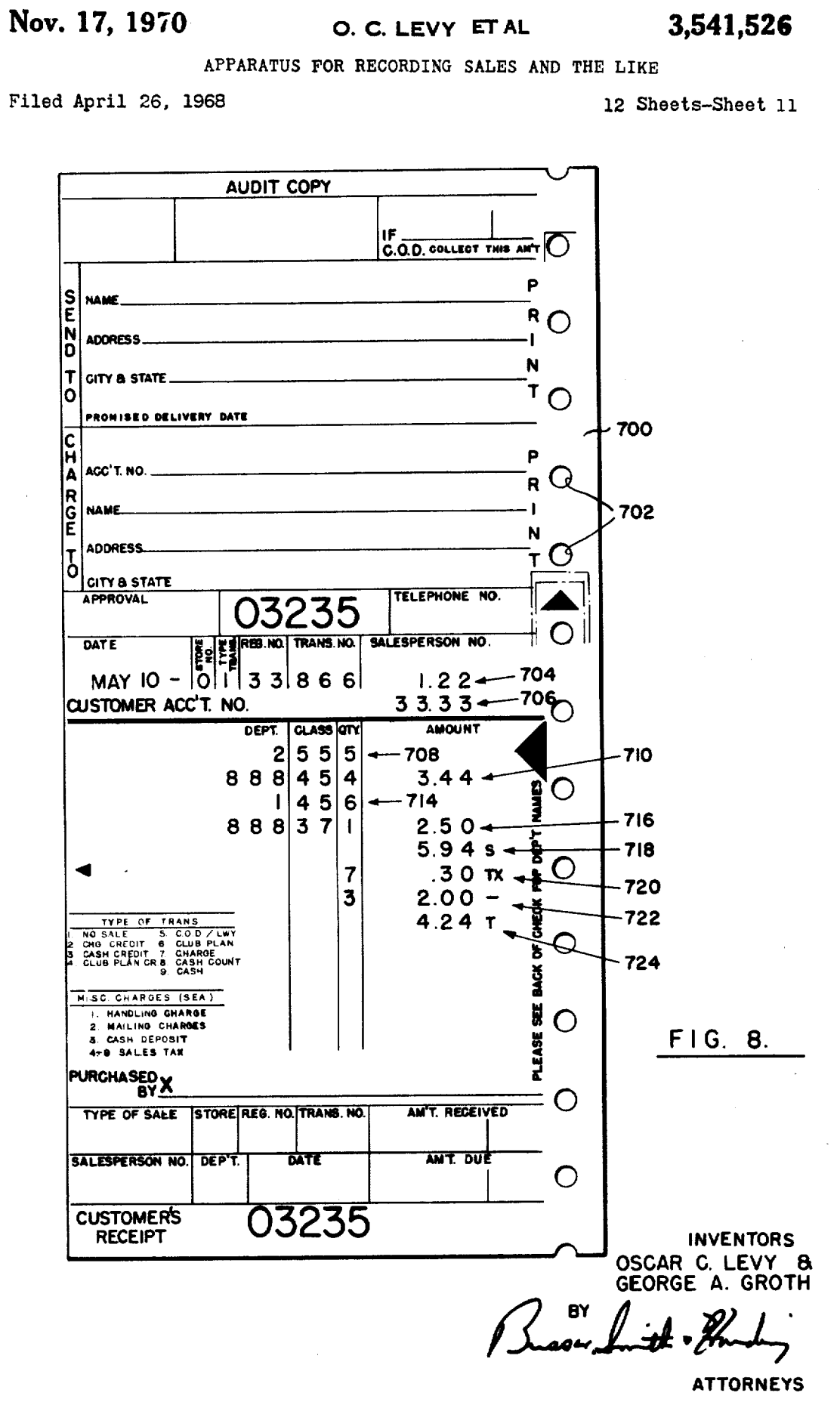

Nov. 17, 1970   O. C. LEVY ET AL   3,541,526
APPARATUS FOR RECORDING SALES AND THE LIKE
Filed April 26, 1968   12 Sheets-Sheet 11

FIG. 8.

INVENTORS
OSCAR C. LEVY &
GEORGE A. GROTH

ATTORNEYS

Nov. 17, 1970  O. C. LEVY ET AL  3,541,526
APPARATUS FOR RECORDING SALES AND THE LIKE
Filed April 26, 1968  12 Sheets-Sheet 12

INVENTORS
OSCAR C. LEVY &
GEORGE A. GROTH

BY

ATTORNEYS

United States Patent Office 3,541,526
Patented Nov. 17, 1970

3,541,526
APPARATUS FOR RECORDING SALES
AND THE LIKE
Oscar C. Levy, Pikesville, and George A. Groth, Fallston,
Md., assignors to American Totalisator Company, Inc.,
Towson, Md., a corporation of Delaware
Filed Apr. 26, 1968, Ser. No. 724,517
Int. Cl. G06f 3/02, 15/02, 15/24
U.S. Cl. 340—172.5
11 Claims

ABSTRACT OF THE DISCLOSURE

Mechanilsm is provided for a point of sale machine which is basically a printing computer capable of addition and subtraction and having a conventional full (11 column) numerical keyboard. One column of the numerical keys is additionally provided with indications of types of transactions so that depression of the keys determines a sequence of selective controls, the keys of this column also providing for printing of decimal designations for the types of transaction. Another column of numerical keys contains indications of the nature of various entries and controls operations corresponding thereto. The various numerical columns have associated with them selectively illuminated legends indicative of entries to be made in groups of columns. Besides the numerical keys, there are keys which are selectively illuminated to provide instructions for input operations on the keyboard by a sales person. These last keys initiate and control operations of the machine. Printing is effected to produce duplicate sales slips. Arrangements are provided for read-out of information inserted in the machine through manipulations of its keys. Associated with the machine is circuitry comprising relays which function to control successive steps of operation during a single transaction. Various auxiliary controls are provided to take proper care of unusual conditions.

BACKGROUND OF THE INVENTION

In the application of Lange, Robinson and Groth Ser. No. 218,064, filed Aug. 20, 1962, Pat. 3,335,407, dated Aug. 8, 1967, a system is provided including a point-of-sale machine which latter involves a computer having a numerical keyboard and an auxiliary keyboard, which latter has its keys illuminated selectively to control sequential operations of a sales transaction. Elaborate computational provisions are made with provision for transmission of information from the point-of-sale machine to a central unit.

SUMMARY OF THE INVENTION

The present invention constitutes an improvement over the system of the patent referred to above. It is far simpler in that, at the point of sale, the machine is a relatively simple computer which has its information read out by a central control. The information is stored for subsequent sorting, computation, and resolution into records from which billing and inventory information can be derived. The computer is of the well-known Clary type, and reference may be made to the following patents for internal mechanical aspects of the computer which are basically involved in the present instance: 2,843,245; 2,879,993; 2,894,449; 2,916,989; 2,983,439; 3,010,647; 3,017,081; 3,023,953; and 3,064,892.

The objects of the invention will be best appreciated from the following description.

BRIEF DESCRIPTION OF THE DRAWINGS

FIG. 3 is a further schematic diagram showing connections of various control solenoids;

FIG. 4 is a schematic diagram illustrating various switches which are operated by keys in the sixth and eleventh columns of the numerical keyboard;

FIG. 6 is a diagram illustrating the array of contacts operable by the numerical keys to provide numerical information storage of the previous line printed by the point of sale machine;

FIG. 8 is an elevation of a typical sales slip printed and issued by the machine in a charge transaction as hereafter described.

DESCRIPTION OF THE PREFERRED EMBODIMENT

Figure 1:
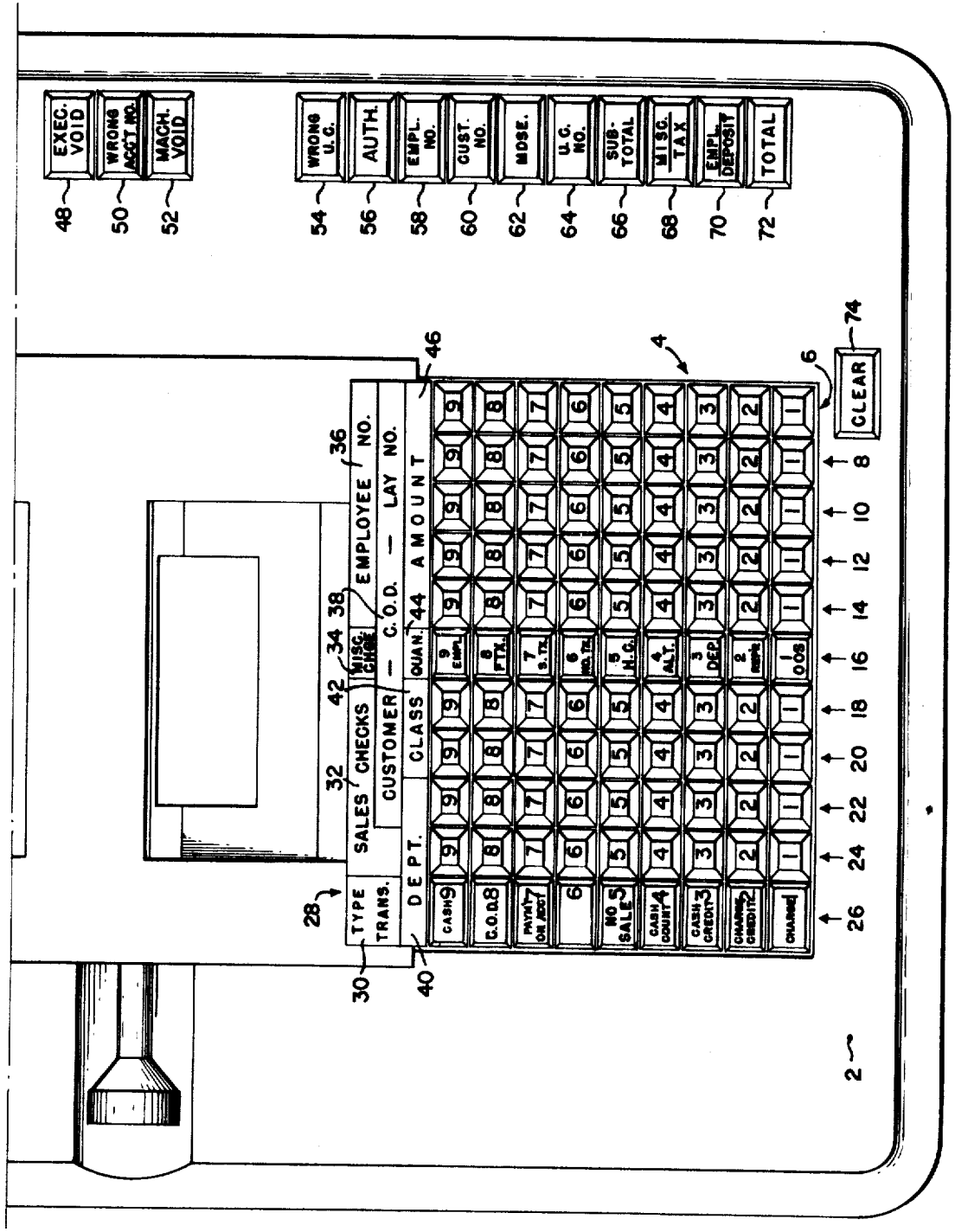
FIG. 1 is a plan view of the machine provided at a point of sale in accordance with invention, illustrating the layout of the keys and the panel indicating the columns in which various entries are to be made.

The machine at the point of sales comprises a modified Clary printer associated with a cash drawer. The printer is of well-known type and reference may be made to the patents referred to above for basic mechanical and electrical aspects of the printer, and it will suffice for description of the present invention to point merely to such changes as are made in the conventional printer as have to do with the present invention. It will be found, for example, that certain keys of the conventional keyboard are omitted though the functions thereof are performed by other keys which have additional functions. The printer includes various additional switches for performing programming functions. As the description proceeds, references will be specially made to the modifications of the printer with reference to the conventional aspects thereof. For an understanding of what is involved it will be convenient to refer first to FIG. 1 showing the keyboard of the machine as it appears to a clerk, giving instructions for operation.

The printer 2 is provided with a bank 4 of numerical keys arranegd in eleven columns of nine keys each designated 6, 8, 10, 12, 14, 16, 18, 20, 22, 24 and 26 of which, hereafter, the most right-hand column 6 will be designated the first column, the most left-hand column 26 being designated the eleventh column. In the conventional printer such a bank of keys is numerical from the standpoint of function, and in the present machine all of the keys of this bank including those of columns 16 and 26 also have numerical significance, being operable at proper times to enter numerical information. However, the columns 16 and 26 (the sixth and eleventh) have additional non-numerical functions. As shown, the keys from one to nine in colum 26 have special designations relating to the type of transaction involved being designated respectively as follows for the choice and termination of the following:

The key in row one is operated when a charge account transaction is involved.

The second key is marked "Charge Credit" and represents a transaction in which a customer's charge account is credited for the amount of a returned item.

The third key is marked "Cash Credit" to represent a transaction in which cash is given to a customer for a returned item.

The fourth key designated "Cash Count" is used as will appear hereafter in the matter of closing for an employee his accounting for a period of duty, with involvement of making a record of cash in the cash drawer.

The fifth key is marked "No Sale" and is operated when a transaction involves free alterations, exchanges of items, or the like, involving no cash or credit exchange, and serves to effect the issuance of a sales slip on which there will be written a notation of the nature of the transaction.

The sixth key in the illustrated machine is blank and may be used for some special transaction which might be involved.

The seventh key is marked "Payment on Account" and is used in a transaction in which a customer having a charge account makes a payment in reduction of his account.

The eighth key is marked "C.O.D." and is operated for C.O.D transactions..

The ninth key, designated "Cash" is operated when a cash transaction is involved.

The keys of the sixth column also contain designations in addition to the numerical designations for the identification of various miscellaneous items.

The first key is marked "O.O.S." standing for "Out of State." It is involved, usually, when a customer out of the state makes a purchase which is to be delivered to his home, such transaction usually involving no payment of a local tax on an item which would normally be subject to such tax.

The second key is used when a repair transaction is involved which involves a monetary charge.

The third key marked "Deposit" is involved in a transaction in which some deposit is made as in a C.O.D. transaction or in which a deposite is made to hold an item for future pick up.

The fourth key designated "Alteration" is used when some alteration in an item is to be made with a monetary involvement.

The fifth key marked "Handling Charge" is used for entering an amount involving handling of an item such as postage, express charges, or the like.

The sixth key indicated "No Tax" may be used to identify a transaction involving some tax-free goods or a customer, such as an institution, exempt from taxation.

The seventh and eighth keys involve, respectively, "State Tax" and "Federal Tax." These are used in the entry of the respective taxes on items.

The ninth key which is designated "Employee" is for an employee's discount.

As will appear more fully hereafter, the keys of this column may have many miscellaneous aspects of significance, and in particular may involve, used in numerically of coded form, various miscellaneous matters, such as segregatoin of different types of cash or tokens in the cash drawer during the cash count operation.

Above the numerical keyboard there is a display panel 28 having various delimited translucent areas arranged to be selectively illuminated by lamps associated with masks to confine illumination selectively to the various areas.

The areas carry lettering and, except for one, indicate to an employee stctions of the keyboard in which entries are to be made.

The area 30 has wording indicating that the type of transaction should be entered by manipulation of a key of the column 26 directly below this area.

An area 32, having no direct relationship to the keyboard, is designated "Sales Checks" and is illuminated to warn an operator that the supply of sales checks has run out.

An area 34 having wording indicative of a miscellaneous charge is vertically above the sixth column 16, and this area is illuminated when an entry in that column is called for.

The area 36 is desingated "Employee No." and extends over the first five columns to indicate that, when it is illuminated, the employee's number should be entered in those columns.

An extended area, 38, above the first nine columns contains the wording "Customer-C.O.D.-Lay No." and indicates, variously, depending upon the type of transaction, that certain data should be entered in these columns. If a transaction involves a customer's account, the account number is to be entered, if known, in the appropriate number of columns. If the transaction involves a club plan, the same type of entry may be made. If the transaction involves a charge, but the customer's number is unknown, or not required, the code number "67" may be entered in the first two columns. If the transaction is C.O.D. or of a layaway type, the appropriate code number "42" or "59" is to be entered in the first two columns.

The area 40 indicates the department involved, and the number for this department should be entered in the last three columns.

The area 42 indicates, when illuminated, that the class of goods is to be entered in the seventh and eighth columns, 18 and 20.

The number of duplicate items being sold is entered in the sixth column as indicated by the illumination of the area 44.

The area 46 designated "Amount" indicates that when illuminated the amount of the transmission should be entered in the first five columns, the first two being for cents and the last three for dollars.

The lamps which respectively illuminate the various areas are shown in a schematic electrical diagram as described hereafter.

At the right of the printer there is a column of keys which differ from those of the conventional printer though some of them have functions which overlap the conventional keys. All of these keys are selectively illuminated by lamps as discussed hereafter in connection with the schematic electrical diagrams. The keys are desirably translucent and bear opaque lettering indicactive of particular conditions including instructions to the employee. The three top keys of this set are special, and are not, strictly, program keys. When the key 48 is depressed in order to void any given transaction by executive action, a voiding operation will take place as hereafter described.

Illumination of the key 50 calls attention to an incorrect entry of an account number.

Key 52 calls for operation by the employee who wishes to void an incomplete transaction due to some error.

The remaining keys at the right of the printer are selectively illuminated program keys involved in directing the employee to execute the operations in the sense of producing entries and printing.

Illumination of key 54 indicates wrong unit control number and involves merely checking of the validity of a number by a coding system. Operation of this key when it is illuminated directs the employee to re-enter the unit control information by causing illumination of key 64.

Key 56 is illuminated when the sales clerk requires authorization to proceed with a transaction. Such illumination may occur when an account is considered unsatisfactory.

Key 58, when illuminated, directs the entry of the employee's number, and when depressed effects printing of the number and sets up the printer for transmission to a central control system. Key 60 does the same for the customer's number.

Keys 62 and 64 direct entry of merchandise identification and unit control number, respectively. When depressed they provide printing and the setting up of the printed for transmission.

Key 66 indicates when illuminated the possibility of securing a subtotal, and depression of the key produces printing and entry of the subtotal. From the arithmetical standpoint it has the function of the usual subtotal key of the conventional printer.

Key 68 and 70 direct and take care of the matter of miscellaneous entries and employee discounts and deposits.

Key 72 indicates that a total may be provided, and its depression produces the printing of a total and also effects termination of the operation for each transaction. Its numerical effect is essentially that of the conventional total key. It also causes ejection of the sales slip.

The usual clearing key 74 is provided to clear the entire numerical keyboard for correction of errors.

In studying the schematic diagrams, it will be noted that operation is by direct current and, in general, return of various circuits is to a common negative supply terminal which will be hereafter merely referred to as "negative." Energization involves either permanent connection to a positive supply terminal or controlled connection thereto through a main operating switch. "Energization" will, in general, refer to connection to positive supply. In the diagrams, unless otherwise noted, electrical elements are illustrated in the conditions assumed when the system is idle.

Referring to FIG. 3, the printer contains a number of control solenoids which are designated 100, 101, 102, 103, 104, 107 and 109, with one terminal of each connected to the negative terminal 106. The selective energizing terminals of these solenoids are respectively designated 108, 110, 112, 114, 116, 111 and 113. Terminal 111 appears also in FIG. 2A; terminals 110, 114 and 116 also appear in FIG. 2D; and terminals 108, 112 and 113 also appear in FIG. 2F.

Figure 7:
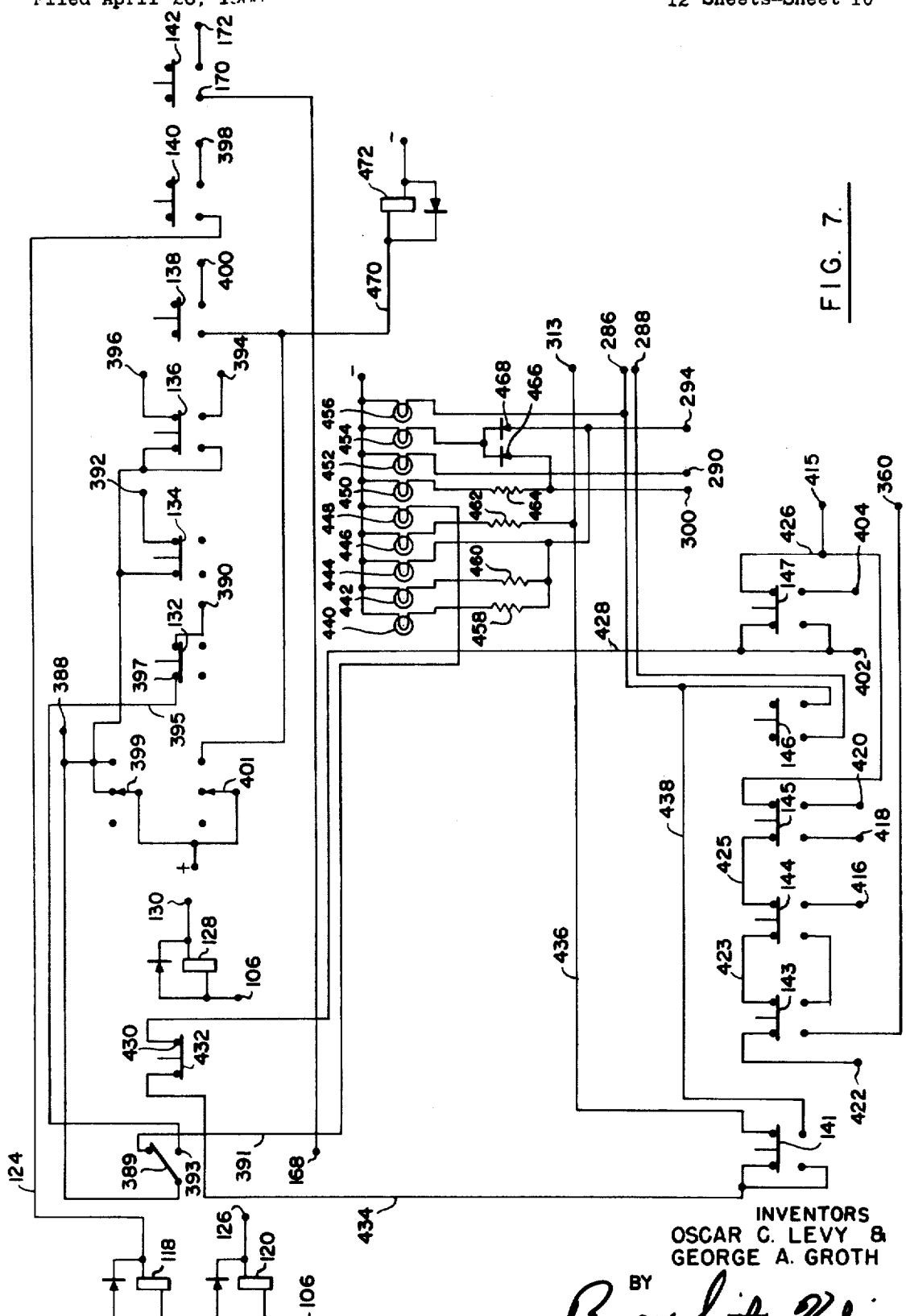
FIG. 7 is a schematic diagram particularly illustrating switches which are mechanically operated in the point-of-sale machine, and also the lamps which illuminate areas of the panel directing entries of information in the keyboard.

Further control solenoids 118, 120 and 128 appear in FIG. 7. These have returns to the negative terminal 106 and have activating connections 124, 126 and 130, respectively. The last two also appear in FIGS. 2F and 2D, respectively.

The functions of the solenoids will appear more fully hereafter, but for convenience of reference they may be described, respectively, as follows: solenoid 100 is involved in entry of an employee's number; solenoid 101 is involved in the taking of a total; solenoid 102 is involved in the taking of a sub-total; solenoid 103 is involved in entry of a tax; solenoid 104 is involved in effecting subtraction; solenoid 107 is involved in a voiding operation; solenoid 109 is involved in performing addition; solenoid 118 is involved in date control; solenoid 120 is involved when an entry is made without addition; and solenoid 128 is involved in ribbon shift.

Switches which are cam-controlled during various parts of the cycle of the printer are shown at 132, 134, 136, 138, 140 and 142 in FIG. 7.

Further switches involved in the printer are 141, 143, 144, 145, 146 and 147, shown in FIG. 7 which are selectively involved in the operation of various columns in the printer.

Switch 141 is moved downwardly when any key in the eleventh column 26 is depressed. Switch 143 is moved downwardly when any key in any of the ninth to eleventh columns 22, 24 or 26 is depressed. Switch 144 is moved downwardly when any key in either the seventh or eighth column 18 or 20 is depressed. Switch 145 is moved downwardly when any key in the sixth column 16 is depressed. Switches 146 and 147 are both moved downwardly when any key in any of the first five colums 6, 8, 10, 12 or 14 is depressed.

Referring to FIG. 4, the keys of the eleventh column 26 of the printer, when depressed, close the respective switches 152, 154, 156, 158, 162, 164 and 166 arranged in the order of the digit keys 2 to 5 and 7 to 9, there being no switches of this group associated with keys 1 and 6. Connections are made between the common terminal 168 which is connected to the fixed contact 170 of switch 142 (FIG. 7). The other fixed contact of switch 142 is connected to the terminal 172 (see also FIG. 2F).

The switches of the group 152–166 connect the terminal 168 respectively to the terminals 176, 178, 180, 182, 186, 188 and 190. The terminals 176, 178, 180, 186, 188 and 190 appear also in FIG. 2D. The terminal 182 appears in FIG. 2E.

Figure 2A:
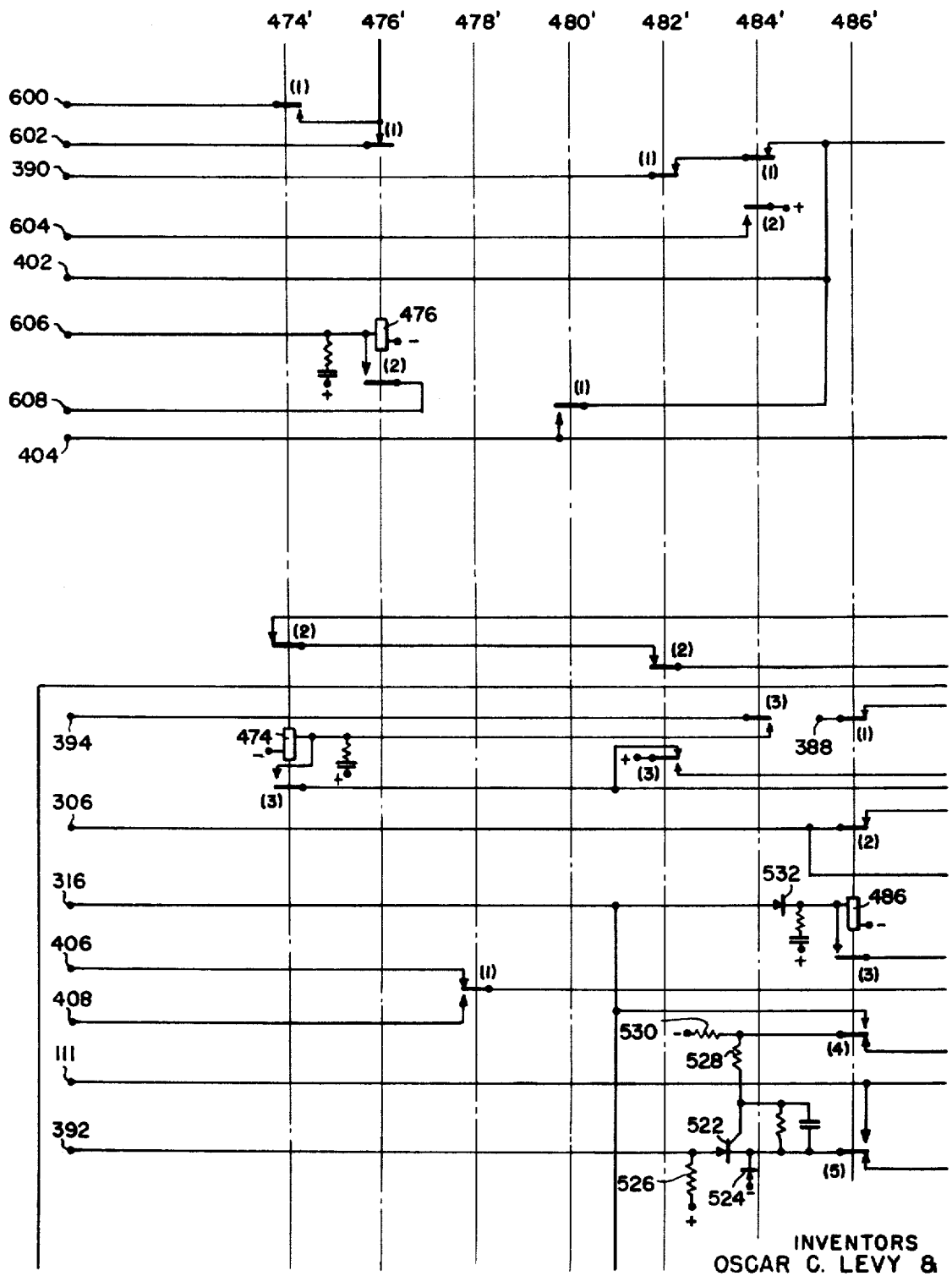
FIGS. 2A to 2F constitute jointly a schematic diagram of control devices including relays and associated elements, these figures being so related that FIGS. 2B and 2C represent successive extensions to the right of FIG. 2A, and FIGS. 2D, 2E and 2F represent continuations from the bottoms of the foregoing figures.
Figure 2B:
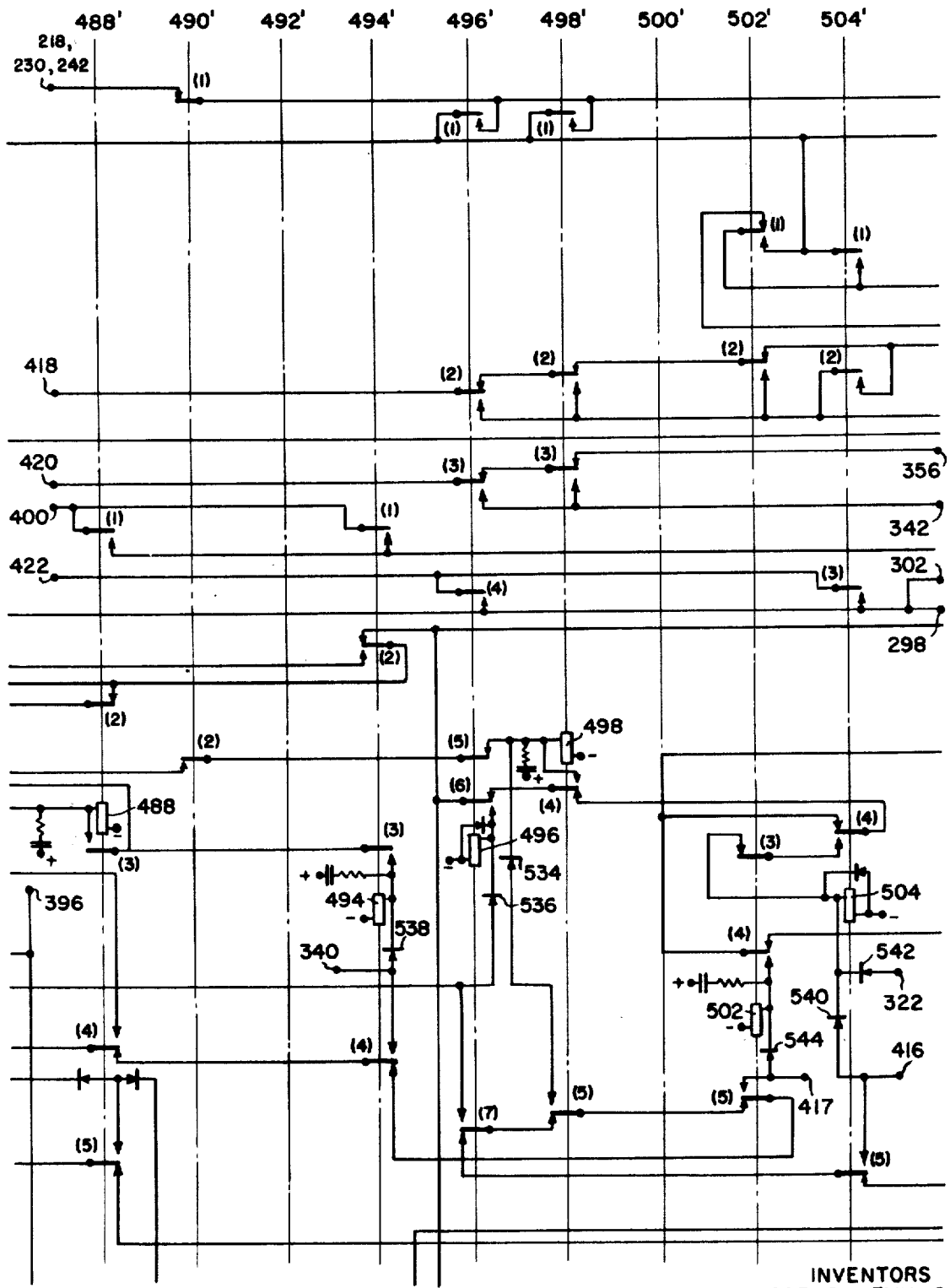
Figure 2C:
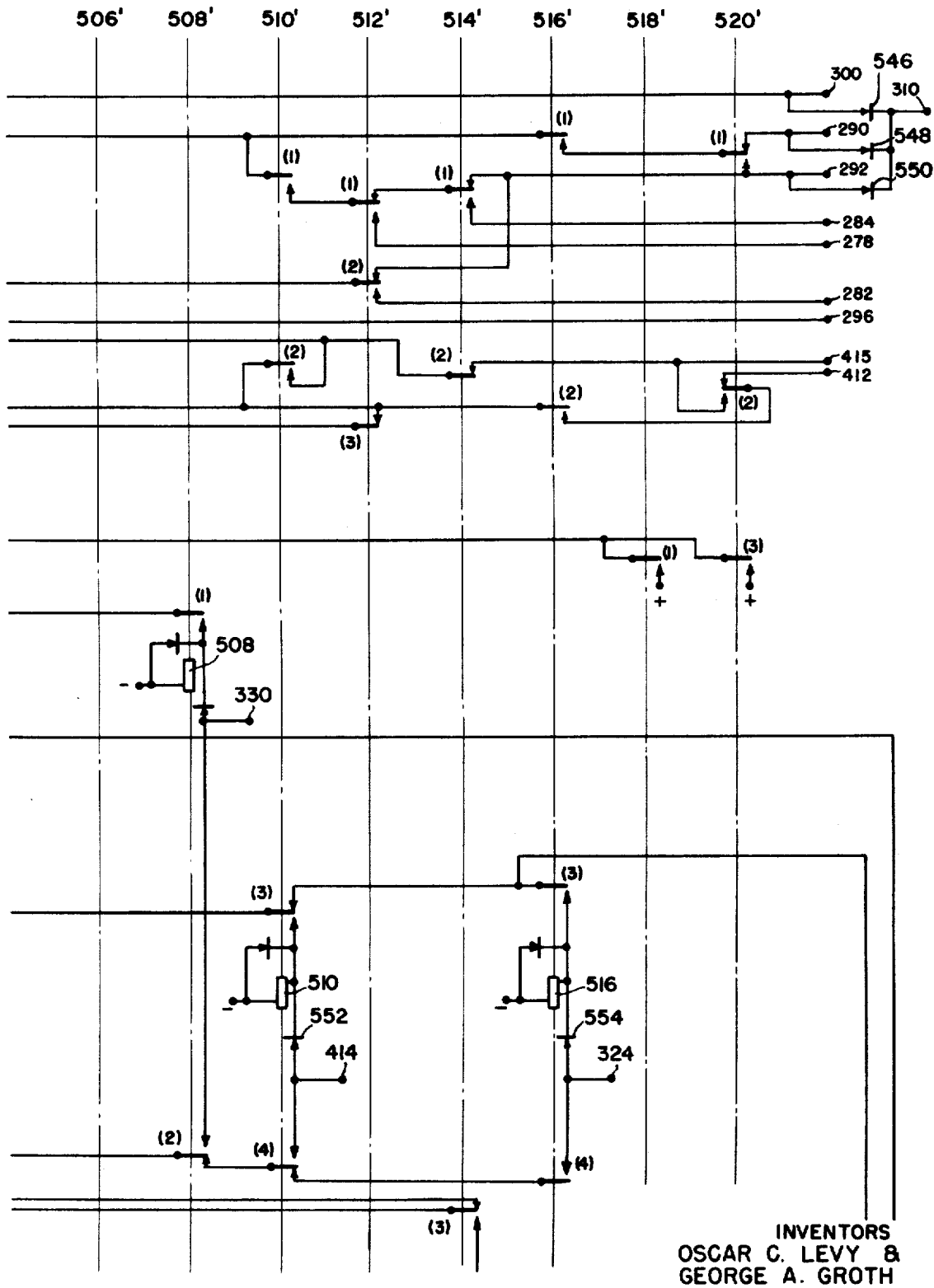
Figure 2D:
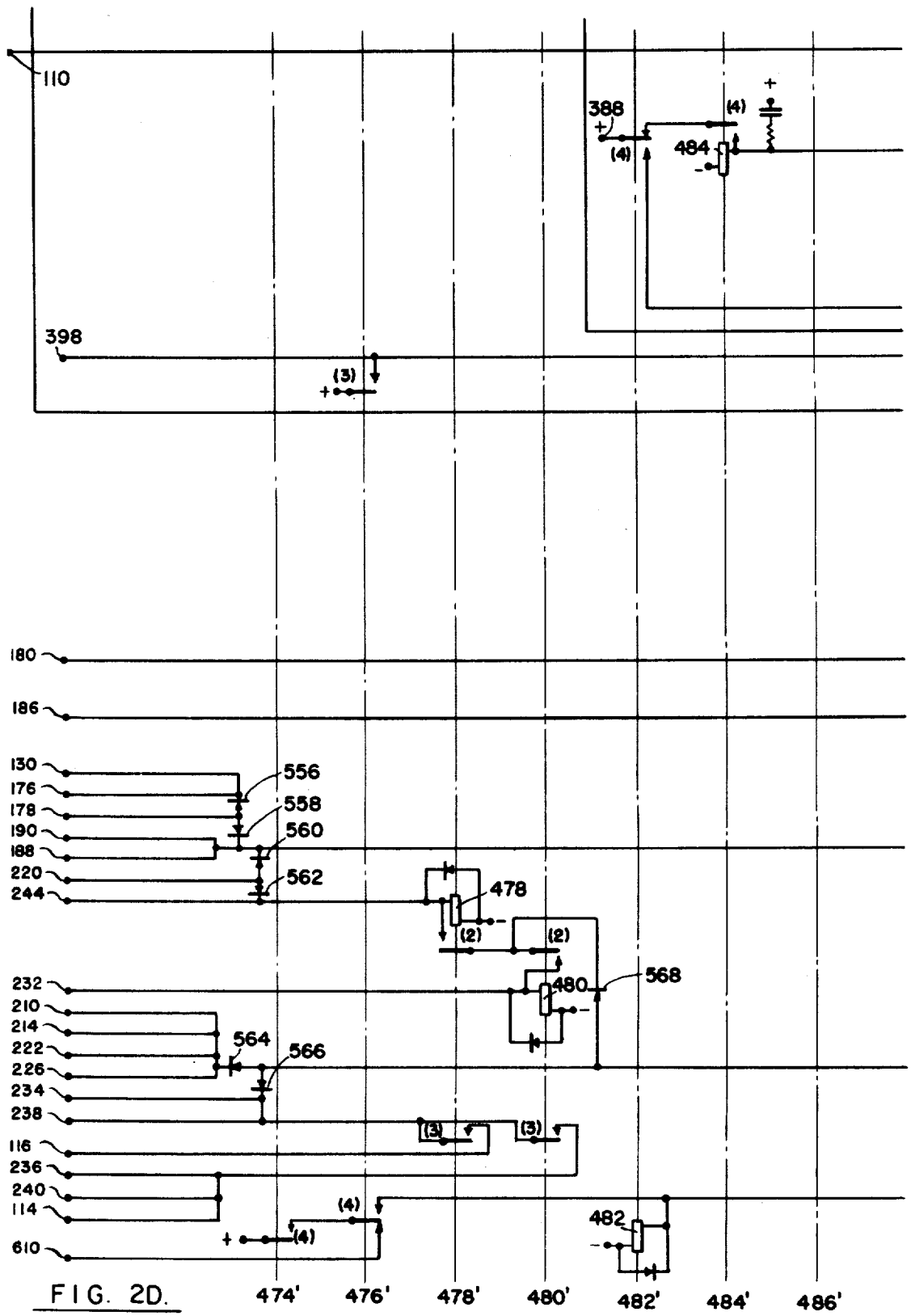
Figure 2E:
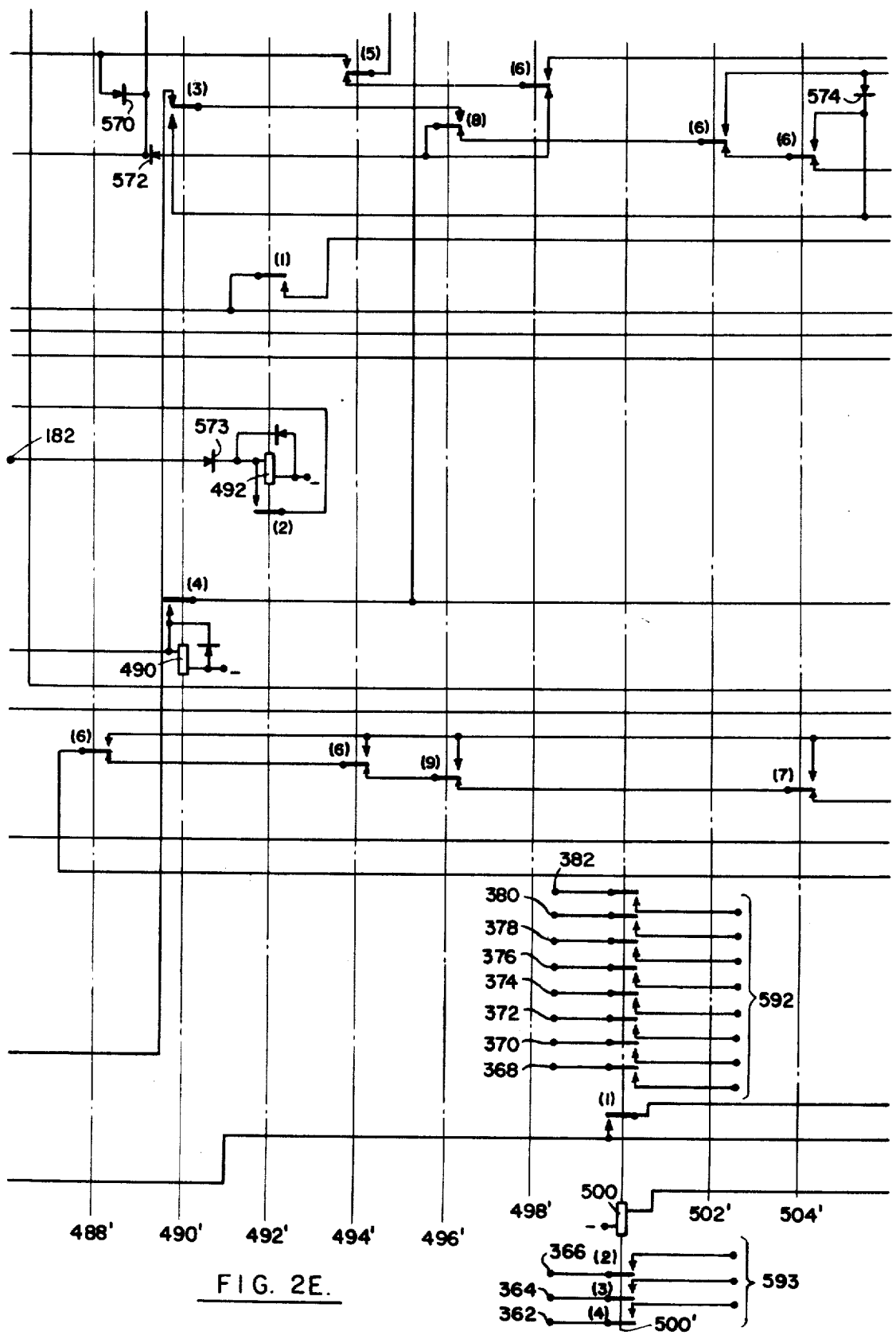
Figure 2F:
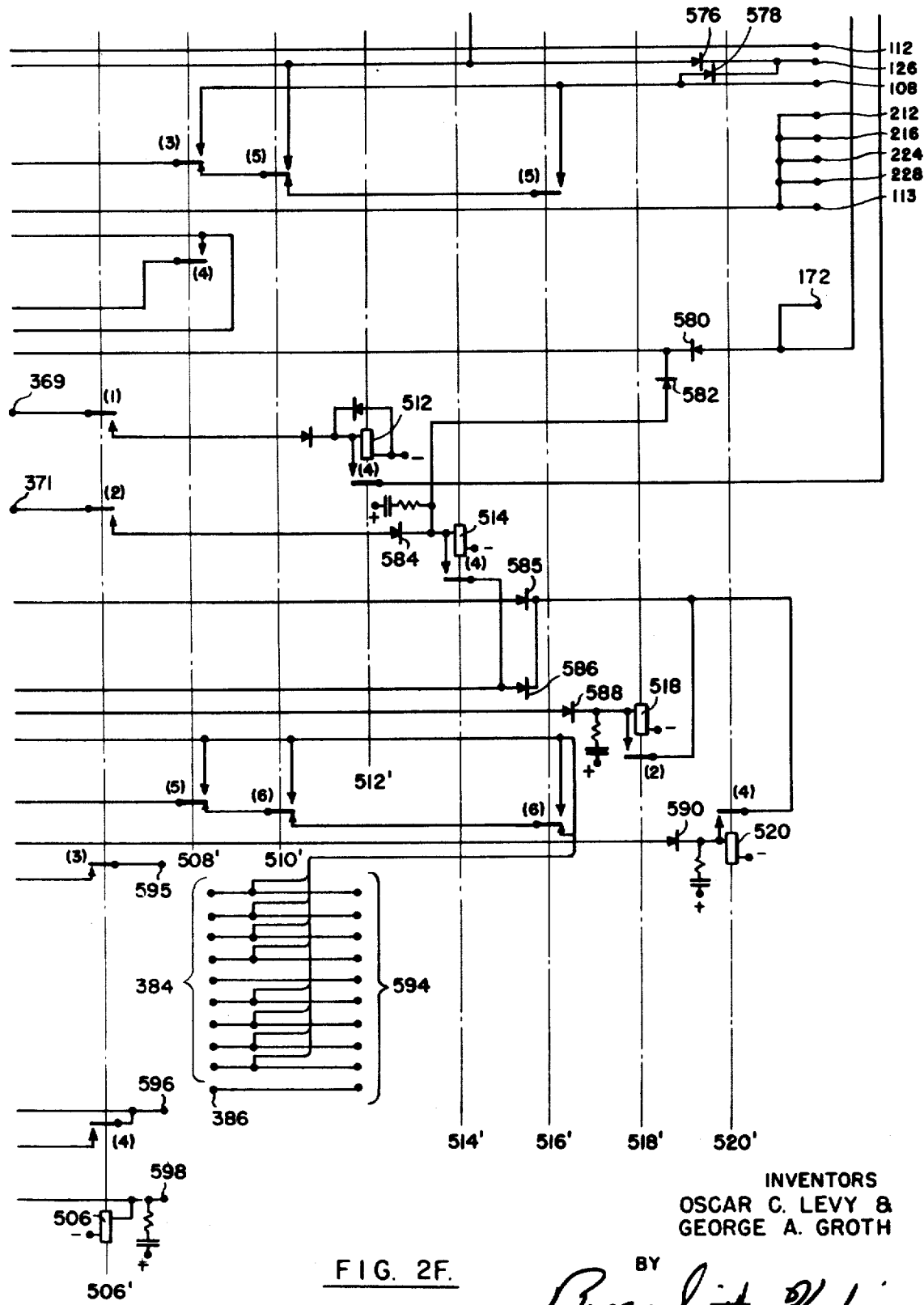

Associated with the keys of the sixth column 16, in the sequence from one to nine, are the respective switches 192, 194, 196, 198, 200, 202, 204, 206 and 208, which interconnect pairs of terminals as shown in FIG. 4. The terminals of this group are also found in other figures as follows:

218, 222, 230 and 242 appear in FIG. 2B; 210, 214, 220, 222, 226, 232, 234, 236, 238, 240 and 244 appear in FIG. 2D; 212, 216, 224 and 228 appear in FIG. 2F.

Figure 5:
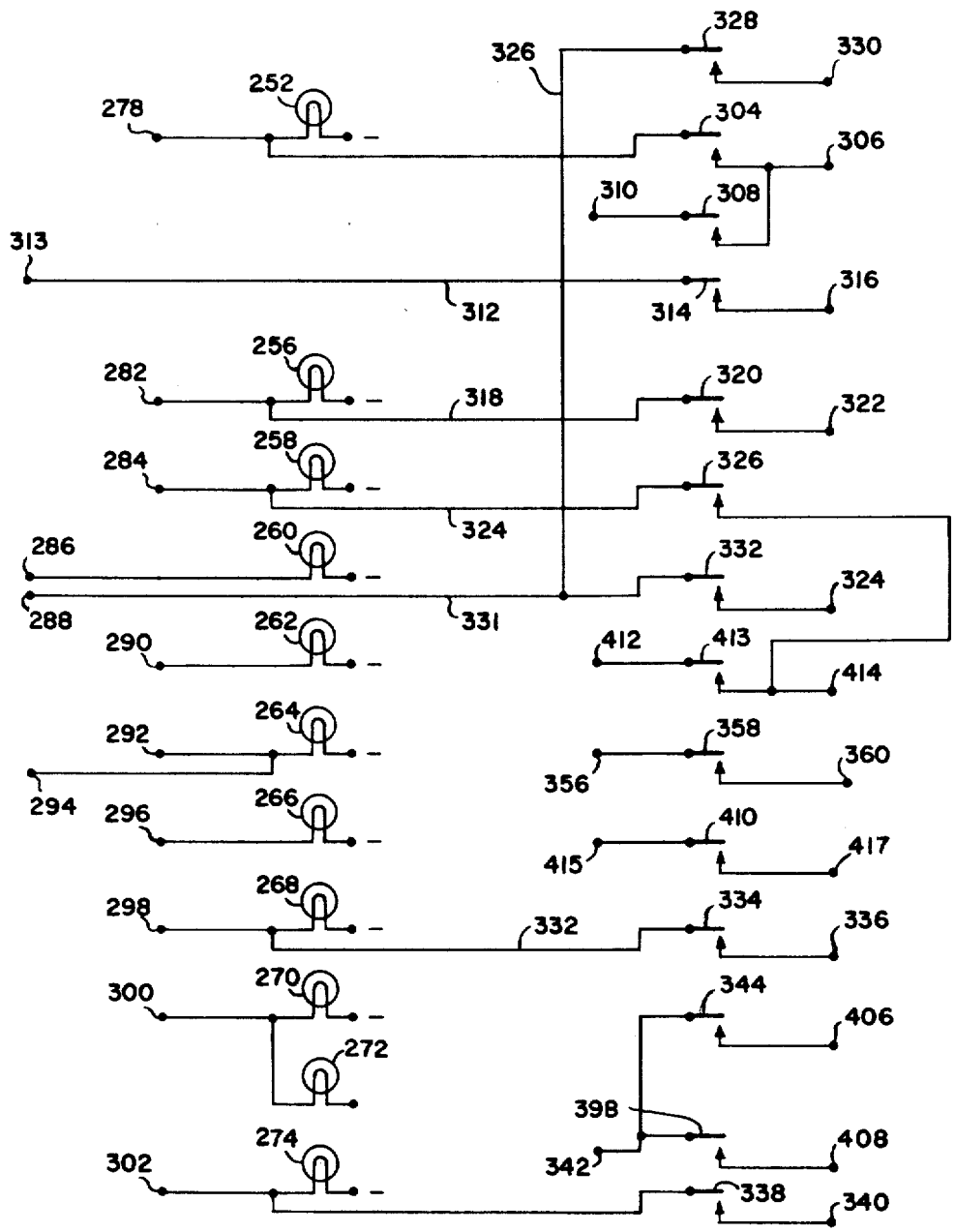
FIG. 5 is a schematic diagram showing both switches operable by the program keys and lamps which selectively illuminate the keys to provide to an operator suitable instructions.

The program keys are selectively illuminated by a number of lamps shown in FIG. 5. These lamps are as follows:

252 illuminates the wrong account key 50; 256 illuminates the wrong unit control key 54; 258 illuminates the authorization key 56; 260 illuminates the employee's number key 58; 262 illuminates the customer's number key 60; 264 illuminates the marchandise entry key 62; 266 illuminates the unit control entry key 64; 268 illuminates the subtotal key 66; 270 illuminates the miscellaneous/tax key 68; 272 illuminates the deposit key 70; and 274 illuminates the total key 72.

Various terminals appear at the left of the lamps in FIG. 5 and most of these appear in other figures as follows:

298 and 302 appear in FIG. 2B; 282, 284, 290, 292, 296 and 300 appear in FIG. 2C; 286, 288 and 294 appear in FIG. 7.

The connections illustrated in FIG. 5 will now be described. Lamp 252 is connected between terminal 278 and negative. The left-hand terminal of lamp 252 is also connected through switch 304 to the terminal 306 (FIG. 2A). The terminal 306 is connectible through switch 308 to the terminal 310.

A terminal 313 is connected through line 312 to a switch 314 which may provide connection to terminal 316 (FIG. 2A).

Lamp 256 is connected between terminal 282 and negative, and also has a connection through switch 320 to terminal 322 (FIG. 2B). Lamp 258 is connected between terminal 284 and negative, and also has a connection 324 to switch 326 which affords connection to the terminal 414 (FIG.2C). Lamp 260 is connected between terminal 286 and negative. A line 331 runs from terminal 288 to a switch 332 which may provide connection to terminal 324 (FIG. 2C). There is also the connection to the switch 328 running to the terminal 330 (FIG. 2C).

The lamp 262 is connected between the terminal 290 and negative.

The lamp 264 is connected between terminals 292 and 294 and negative.

The lamps 266 and 268 are respectively connected between terminals 296 and 298 and negative. The lamp 268 is also connected through line 333 to the switch 334 adapted to connect it to the terminal 336. Both of the lamps 270 and 272 are connected to the terminal 300 and to negative. Lamp 274 is connected between terminal 302 and negative and also through switch 338 to terminal 340. Besides the switch connections already described, the following connections are shown in FIG. 5:

Switch 413 is connected between terminals 412 and 414 (FIG. 2C). The latter terminal is connected to the switch 326 as previously mentioned.

Switch 358 is connected between the terminals 356 and 360. Switch 410 is connected between terminals 415 and 417. A terminal 342 is arranged to be connected through the respective switches 344 and 398 with the terminals 406 and 408.

The switches shown in FIG. 5 are arranged to be closed upon depressions of the keys of the right-hand set as follows:

Switch 328 is closed by depression of key 48. Switch 304 is closed upon depression of key 50. Switches 308 and 314 are both closed upon depression of key 52.

Switch 320 is closed upon depression of key 54. Switch 326 is closed upon depression of key 56.

Switch 332 is closed upon depression of key 58. Switch 413 is closed upon depression of key 60. Switch 358 is closed upon depression of key 62. Switch 410 is closed upon depression of key 64.

Switch 334 is closed upon depression of the subtotal key 66.

Switch 334 is closed upon depression of the key 68. Switch 398 is closed upon depression of the employee discount and deposite key 70. Switch 338 is closed upon depression of the total key 72.

Referring to FIG. 6, the eleven terminals designated by the even numbers running from 362 to 382 are connected to the movable contacts associated with the racks of the respective eleven columns of the printer. These terminals additionally appear in FIG. 2E.

Crosswise contacts associating respectively with the rows of keys corresponding to the numerals one to nine are designated collectively at 384 in FIG. 6 and these also appear in FIG. 2F. A further horizontal contact, representing zero, is connected to terminal 386 (FIG. 6 and 2F).

A terminal 388 (FIG. 7) is connected to a switch 389 which, in the absence of a supply of sales slips, engages an upper contact connected at 391 to lamp 448 which illuminates the area 32 of panel 28 to warn a clerk of the absence of a sales check in proper position. The lower contact 393 of this switch is connected at 395 to a contact 397 of switch 132, arranged to be bridged by that switch to the terminal 390. Switch 389 is in its lower position when a sales slip is present in position, being engaged thereby.

A terminal 392 is connected to one contact of switch 134, the other contact of which is connected to terminal 388.

A terminal 394 is arranged to be engaged by the switch 136 when depressed to connect this terminal to terminal 388.

Terminal 396 is arranged to be connected to terminal 388 when the switch 136 is in its upper position.

Switch 140 in its lower position connects the line 124 to the terminal 398.

When switch 138 is depreseed, connection is provided between terminal 400 and a switch terminal 403.

A controlled lock (not shown) has three possible positions, a central position in which the printer is in an operative condition, a left-hand position in which the printer is deenergized, and a right-hand position in which it will effect the opening of a cash drawer. From the electrical standpoint this lock is associated with a pair of switches (which physically are microswitches) but which may be diagrammed as indicated at 399 and 401 as having movable contacts having positions corresponding to those of the lock. The movable contacts are connected to the positive supply terminal. In its left-hand position the movable contacts open their circuits. In its central and right-hand positions contact 399 connects position to terminal 388 which is the main positive terminal during operation, controlled energizing power being provided the contact 401 is open, but in its right-hand position from this terminal. In its central and left-hand positions connection is provided between the positive supply terminal and the fixed contact 403 of switch 138.

A terminal 402 is arranged to be connected to a terminal 404 upon depression of switch 147. A terminal 416 is arranged to be connected to a lower terminal of switch 143 upon depression of switch 144. A terminal 418 is arranged to be connected to a terminal 420 by depression of switch 145. A terminal 360 (FIG. 5) is connected to the other terminal of switch 143.

When the switch 143 is in its upper position it connects terminal 422 to a connection 423 which runs to a contact engageable by switch 144 in its upper position connecting this through connection 425 to a contact of switch 145, and when this last switch is in its upper position connection is provided to an upper contact of switch 147 through line 426, the switch 147 then connecting this line to the terminal 402. Line 426 is connected to a terminal 417.

When the switch 146 is depressed it interconnects the terminals 286 and 288 (FIG. 5).

The terminal 402 is connected through the line 428 to a contact 430 of switch 432 and connects this terminal through line 434 to upper and lower contacts of switch 141. When the switch 141 is in its upper position connection is made through line 436 to terminal 313 (FIG. 5). When the switch 141 is in its lower position connection is made to terminal 286 through the line 438.

Switch 432 is in its upper, operative position, when a sales check is in a proper lengthwise position for proper printing.

For illumination of the instruction panel above the keyboard there are provided various lamps numbered 440 to 456. These lamps provide illumination of areas of the panel 28 as follows:

Lamp 440 provides the instruction for entry of the department number in area 40; lamp 442 illuminates area 42 to instruct the entry of a class number; lamp 444 illuminates area 44 to direct the entry of quantity; lamp 446 illuminates area 30 to provide instruction for the entry of the type of transaction; lamp 448 indicates the absence of sales checks by illuminating area 32 as already mentioned; lamp 450 illuminates area 34 to direct the insertion of miscellaneous coding; lamp 452 illuminates area 38 to direct the entry of the customers account number; lamp 454 illuminates area 46 to direct entry of the amount of a transaction; and lamp 456 illuminates area 36 to direct the entry of the employee's number.

All of the lamps are returned to negative. Lamps 440 and 442 are respectively energized through resistors 458 and 460 from the terminal 294. Lamp 444 is energized from the same terminal without the interposition of a resistor. Lamp 446 is connected through resistor 462 to terminal 313. Lamp 448 is connected to the upper contact of switch 389. Lamp 450 is connected through resistor 464 to terminal 300. Lamp 452 is connected to terminal 290. Lamp 454 is connected through diode 466 to terminal 300, and is also connected through diode 468 to terminal 294. The diodes provide isolation of the two terminals from each other, with the lamp 454 being capable of energization through either diode. Lamp 456 is connected to terminal 286.

A connection 470 from the right-hand fixed contact of switch 401 runs to the drawer-releasing solenoid 472.

Reference may now be made to the six FIGS. 2A to 2F, inclusive, which may be best considered by viewing them in two rows, one of FIGS. 2A, 2B, and 2C in that order, with FIGS. 2D, 2E, and 2F located respectively below them in a second row. The elements of these figures are primarily relays and their connections, which relays are designated by the even numerals running from 474 to 520, inclusive. Running through each relay vertically and continuing through upper and lower corresponding figures are lines which are designated by the numbers of the relays primed. Along these lines are numerous movable contacts of the relays, all shown in their original rest positions, but operated by energization of the relays to their alternative positions. The movable contacts above the relays are moved downwardly upon relay enregization, while those below the relays are moved upwardly. In these figures the contacts are marked by numerals in parentheses, and in the description the individual contacts will be designated by the number of the relay followed by such numeral. For simplicity inactive contacts merely acting as stops are omitted. While single relays are illustrated for simplicity, some of them have such large numbers of contacts that in fact a single relay may be physically constituted by two or more relays arranged in parallel. It will be observed that various of the relays have associated with them either diodes for transient suppression or resistance-capacitance combinations to proivde time delays. These expedients are conventional and will not be described in detail. Connections of the relays and their contacts need not be described in detail since functional operations will become apparent hereafter.

For convenience of reference, the relays may be briefly referred to in connection with their functions as follows:

474 is a relay involved in initiation of transmission of information as will be described more fully hereafter.

Relay 476 is involved in line connection.

Relay 478 is involved in control by the keys 3 and 9 of the sixth column 16 of the keyboard.

Relay 480 is involved in control by the number 6 key of column 16 of the keyboard.

Relay 482 is involved in completion of operation.

Relay 484 is involved in key control.

Relay 486 is involved in the cutting off of transmission.

Relay 488 is involved in the voiding of a transaction.

Relay 490 is involved in the cash count operation.

Relay 492 is involved in a "No Sale" operation.

Relay 494 is involved in the entry of a total.

Relay 496 is involved in miscellaneous entry.

Relay 498 is involved in the entry of a subtotal.

Relay 500 is involved in the giving of access to the printer by the read-out system.

Relay 502 is involved in a unit control entry.

Relay 504 is involved in connection with an item entry.

Relay 506 is also involved in access.

Relay 508 is involved in executive void operation.

Relay 510 is involved in the entry of account numbers.

Relay 512 is involved in the "Wrong Number" operation.

Relay 514 is involved in an authorization operation.

Relay 516 is involved in control of the production of a heading line.

Relay 518 is involved when a payment is being made.

Relay 520 is involved in the release of the cash drawer.

Involved also in the operation is a silicon controlled rectifier 522 shown in FIG. 2A. A diode 524 connects the cathode of this controlled rectifier to negative providing a bias. The anode of the controlled rectifier is connected through resistor 526 of high value to the positive supply terminal. The gate of the controlled rectifier is connected through resistors 528 and 530 to negative. Other connections to the elements of the controlled rectifier will become apparent from the subsequent description of operation.

A diode 532 is provided in the energizing line for relay 486 running from the terminal 316.

Referring next to FIG. 2B, there are provided as shown therein various current-routing diodes 534, 536, 538, 540, 542 and 544 the functions of which will become evident hereafter.

As shown in FIG. 2C, diodes 546, 548 and 550 are associated with the terminals 310, 300, 290 and 292 to provide current isolating during operation. Shown in this figure are also functional diodes 552 and 554.

Referring to FIG. 2D, there are diodes 556, 558, 560, 562, 564 and 566 associated with various terminals as shown at the lower left of that figure. A further functional diode is involved at 568.

In FIG. 2E, there are the functional diodes 570, 572, 573 and 574.

In FIG. 2F, there are the functional diodes 576, 578, 580, 582, 584, 585, 586, 588 and 590.

Various transmission terminals 592 and 593 appear in FIG. 2E, while further transmission terminals 594 appear in FIG. 2F. Additional transmission terminals are illustrated at 596 and 598.

Additional transmission terminals are provided at 600, 602, 604, 606 and 608 (FIG. 2A) and at 610 (FIG. 2D).

The operation may be conveniently described by referring to a typical transaction, first disregarding, except where pertinent, various secondary controls.

When the system is at rest, with a sales slip properly located, there is displayed on the panel the direction for entry of the type of transaction by illumination of the area 30 by the lamp 446 indicating that a choice should be made in the eleventh keyboard column 26. The electrical connections involved are the following:

With the key in the central operating position, a positive potential is applied through the closed switch 399 to the terminal 388 and, tracing this terminal connection to the left, it passes to switch 389, which will be in its lower position by reason of the presence of sales forms so that the potential is applied through contact 393 by way of line 395 to contact 397 of switch 132 which will be closed to provide the potential to terminal 390. The terminal 390 appears in FIG. 2A and the circuit may be traced through normally closed contacts 482(1) and 484(1). To the right of the last there is a branch which at this time is open. Another branch runs to terminal 402 which appears at the bottom of FIG. 7.

From terminal 402 a branch runs through the normally closed switch 147 and then by way of connection 426 through normally closed switch 145, connection 425, switch 144, connection 423, and switch 143 to terminal 422. Terminal 422 appears in FIG. 2B and its connections are opened at this time at contacts 496(4) and 504(3). Returning to terminal 402 (FIG. 7) the alternate path may be traced through connection 428, through switch 432, which is closed when a sales form is in proper position, and then through connection 434, switch 141, connection 436 and through resistor 462 to the lamp 446 which is thereby illuminated. If a sales slip is not in proper lengthwise position, switch 432 is open and lamp 446 will not be lighted.

To initiate an operation, the clerk must depress a selected key in the eleventh column 26. To describe consistently a typical operation, it will be assumed that the clerk depresses the key for a charge transaction, i.e., the key bearing the numeral 1 in that column. The depression of this key depresses the switches 141 and 143 (FIG. 7).

Considering, first, switch 141, the already energized circuit at its left now energizes connection 438 running to terminal 286 and to lamp 456, the latter being energized to illuminate the area 36 to direct the entry of the employee's number in the first to fifth key columns. The terminal 286 (FIG. 5) energizes lamp 260 to illuminate the employee's number program key 58.

The movement of switch 143 to its lower position produces no result at this time.

The employee's number should now be entered in the first five columns of the keyboard. Aside from setting up the keyboard for printing and transmission, this operation additionally moves to their lower positions the switches 146 and 147. The depression of switch 147 at this time produces no result.

Switch 146 is connected at its left to terminal 288, which is connected to the now open switches 328 and 332, the latter being operable by the employee's number key of the program group. The right-hand lower contact of switch 146 runs to positive potential by reason of connection to terminal 286 which is already positive as described above.

The employee's number program key 58 is now depressed to initiate a cycle of operation of the printer and electrical readout. The result of depression of the employee's number key is closure of switch 332 which connects the now positive terminal 288 to terminal 324. Referring to FIG. 2C, it will be seen that energization of terminal 324 energizes the relay 516 through diode 554. One result of this is to fire the controlled rectifier 522 from terminal 324 through the closing of contacts 516(4). The connection through a number of closed relay contacts to the junction of resistors 528 and 530 may be readily traced and need not be described in detail, the connections rendering the controlled rectifier gate positive, changing its previous negative bias.

Referring to FIG. 7, it will be noted that the anode of the controlled rectifier is positive through the connection of terminal 392 to the terminal 388 through the switch 134 which is at this time in its closed upper position. (The resistor 526 connected between the anode of the controlled rectifier and the positive terminal has a large value, e.g., one megohm, which maintains a bias but through which, alone, the rectifier would not fire.)

The cathode circuit of the controlled rectifier may be traced through a number of closed relay contacts to the contacts 516(5), now closed, and to the terminals 108 and 126. The terminal 108 (FIG. 3) is the energizing terminal for the employee's number solenoid 100; the terminal 126 (FIG. 7) is the energizing terminal for the non-add solenoid 120. Connection of the controlled rectifier cathode through various closed relay contacts and the diode 572 may be traced to the key control relay 484, and this is also energized by the firing of the controlled rectifier.

Closure of contact 516(1) has no effect due to energization of relay 484.

The opening of 516(2) produces no result at this time.

The closure of 516(3) provides a holding circuit from terminal 388 through a series of closed contacts of various relays. Accordingly, relay 516 remains energized when its original energizing circuit becomes opened.

The remaining contacts 516(6) are involved in the read-out operation which will be later described.

Closure of contacts 484(2) renders terminal 604 positive but the operation is involved in read-out and description will be deferred.

Closing of contacts 484(3) connects terminal 394 to relay 474, but there is no immediate result since terminal 394 is open at switch 136 (FIG. 7). Contacts 484(4) are closed to provide a holding circuit for relay 484 from the terminal 388.

The conditions of the control elements resulting from depression of the employee's number program key (closing switch 332) and previously described operations may be summarized as follows:

The controlled rectifier, once fired, remains so until its anode-cathode supply is cut off, and solenoids 100 and 126 are energized thereby. Relay 516 is energized through its holding circuit from terminal 388 through 486(1), 488(2), 494(2), 496(6), 498(4), 504(4), 502(4), 510(3), and its own contacts 516(3). Key 1 in column 11 remains depressed, and switches 141, 143, 146 and 147 remain depressed. Relay 484 is energized through its own holding circuit.

The cycle of operation of the printer now starts, being initiated by the energization of the employee solenoid 100.

The switches 132, 134, 136, 138, 140 and 142 are operated by cams moving through 360° during the complete cycle of the printer. All of these switches occupy the positions indicated at the initiation of the printer cycle (0°). They will be in their lowered positions during operation of the printer as follows:

132 is open from 10° to 340°; 134 is open from 10° to 355°; 136 is down from 320° to 350°; 138 is closed from 20° to 280°; 140 is closed from 160° to 210°; and 142 is closed from 20° to 150°.

Once started, the Clary printer goes through its complete cycle. This printer is mechanically conventional and involves column racks which move from positions previously held to initial positions and then move to positions corresponding to the keys depressed, which positions are thereafter maintained through the remainder of the cycle for printing and transmission of electrical signals, these positions being then retained after the end of the cycle and until a new cycle is initiated. Following the setting up of the racks the numerical keys, including those of the eleventh column, are released. The electrical contacts carried by the racks move variably with them. To avoid contact wear, the cooperating fixed contacts are carried by a plate which moves them out of the path of the movable contacts, being restored only when the movements of the movable contacts terminate. The program keys are not held down since they merely fire the controlled rectifier which remains conductive, preserving for the required time the operations which are initiated.

The sequence of events during a printer cycle are as follows:

At 10° the opening of switch 132 deenergizes the terminal 390. The deenergization is not immediately significant since contact 484(1) is open.

At 10° the switch 134 also opens, deenergizing terminal 392, removing the anode supply from the controlled rectifier 522 and thus turning it off. The solenoids 100 and 126 are deenergized, but they have already performed their functions in controlling the printer.

At 20°, the switch 138 closes. However, connections to 400 are open and no functional result occurs.

At 20°, switch 142 connects the terminals 170 and 172. 170 is connected to terminal 168 which is common to all of the eleventh column switches (FIG. 4). However there is no switch associated with the charge key so no result now occurs. It will be noted that terminal 172 (FIG. 2F) has a connection to the left of contacts 516(3), and therefore to the holding circuit of relay 516 previously described, which holding circuit is operative.

At 150°, the switch 142 opens, without any result except that of deenergizing all of the switches in the eleventh column. (This is not of significance in the present operation; but it is in alternative operations.)

At 160°, switch 140 closes. The left-hand contact of this switch is connected through 124 to the date control solenoid 118. Its right-hand contact runs to terminal 398. This terminal is energized through the connections running from terminal 388, i.e., through 486(1), 488(2), 494(2), 496(6), 498(4), 504(4), 502(4), 510(3) and diode 580. The date control solenoid 118 is accordingly energized to print the date and other heading information.

At 210°, the switch 140 opens deenergizing the solenoid 118.

At 280°, the switch 138 opens without functional result.

At 320°, switch 136 moves downwardly and connection 396 is deenergized while connection 394 is energized from terminal 388.

The deenergizing of 396 (FIG. 2B) has at this time no result.

Since relay 484 is energized, relay 474 is energized through 484(3) from terminal 394. This is self-held through 474(3) and through 482(3) running to positive. 474(2) opens with no result. 474(1) and 474(4) are involved in control of transmission.

The next events occur at 340°, at which time switch 132 closes, energizing terminal 390. At this time switches 134, 138, 140 and 142 are open. Switch 136 is down, so that terminal 394 is energized while 396 is deenergized. Relay 516 remains energized, and while due to completion of transmission they may be otherwise, it will be assumed that relays 474 and 484 are also now energized.

Closing of switch 132 connects terminal 390 to energizing terminal 388 but 484(1) is open in accordance with the assumption just made.

After 340°, transmission will be completed. Access relays 500 and 506 will have been energized and consequently their contacts 500(1) and 506(4) will be closed so that a transmission termination signal from terminal 596 will energize relay 482, to open its contacts 482(1) and 482(2) and shift its contacts 482(3) and 482(4). The only significant result is opening of the holding circuit of relay 484 which becomes deenergized. Relay 482 has no self-holding circuit and becomes deenergized after its momentary operation.

The results, then, are the folowing:

Contacts 516(1) being closed, terminals 290 and 310 (FIGS. 2C, 5 and 7) are energized, the former illuminating lamps 262 and 452 relating to a customer's number.

Relay 474 is deenergized by the conjoint actions of relays 482 and 484.

At 350° switch 136 rises to deenergize terminal 394 and energize terminal 396 (FIG. 2B), all of the connections of which are now open.

At 355° switch 134 recloses energizing the anode of the controlled rectifier 522, preparing it for firing in the next operation.

The entire system is now in the condition initially existing when the type of transaction was called for, except that relay 516 remains energized, calling for, and directing the location of entry of, the customer's account number of illumination of the respective lamps 262 and 452. Operation of the printer will have advanced the sales slip to the next position for printing thereon.

Movement of the sales slip will open switch 432 preventing illumination of the lamp 446. The printing by the Clary printer will produce a heading line which, as indicated in FIG. 8, contains the date, the store number, the register number and the transaction number. Additionally the heading contains, with a code number, the type of transaction (in this case 1) and the employee's number. The type transaction number results from the depression of the key in the eleventh column; the employee's number results from the depression of keys in the first to fifth columns. The date is printed by a fixed, but adjustable, printing head in the machine. The store number and the register number are printed by fixed slugs. The transaction number is printed by a numbering head which is advanced one unit for each transaction. These last mentioned matters are printed only once in a single transaction (in the heading line) under control of the employee solenoid 100.

Transmission of the information in the machine is as follows:

When the start transmission relay 474 is energized at 320°, a signal is transmitted to the central unit indicating that the printer is ready for transmission.

Contacts 474(1) connect terminals 600 and 602. Contacts 474(4) connect positive to terminal 610. These last mentioned terminals run to the central unit.

In response to signals given to the central unit it provides energization for relays 500 and 506 which are the access relays. Contacts 500(1) connect the external terminal 596 to the "complete" relay 482 to provide energization thereof when a signal is delivered to terminal 596 from the central unit. Contacts 500(2), 500(3) and 500(4) connect the various reading terminals 366, 364 and 362 to terminals of a group 593 connected to the central unit. The remaining vertical columns in FIG. 6 are connected through other contacts of relay 500 to a group of terminals 592 which are connected to the central unit. Information is thus controlled for reading of the individual columns. The horizontal bars in FIG. 6 have connections of the group 384 and 386 connected individually to terminals of the group 594 which run to the central unit.

Closure of contacts 506(1) connects the external terminal 369 to the winding of the "Wrong Number" relay 512 and contacts 506(2) connect the external terminal 371 to the winding of the authorization relay 514. In a satisfactory transaction, these relays will not be energized, becoming energized only if numbers are unsatisfactory.

Contacts 506(3) connect a contact 595 running to the central unit through contacts 488(6), 494(6), 496(9), 504(7), 508(5), 510(6) and 516(6) running to the lines connecting terminals 384 to terminals 594.

Contacts 506(4) are in parallel with contacts 50(1) and have the same function.

It will be evident that the foregoing operations involve the following:

Transmission is initiated by a signal to the central unit, which in turn provides energization for scanning the setup of the printer to effect entry of the information in the central unit. When this operation is completed the central unit energizes the "complete" relay 482, to effect the operations already described. Following the transmission the depressed keys of the keyboard are released mechanically in the usual fashion.

The customer's account number is now entered, one or more digits being entered in the first to fifth columns. The results is depression of switches 146 and 147. Depression of switch 146 is not now material; but switch 147 now connects terminal 402 (energized as already described) to terminal 404. Referring to FIGS. 2A and 2C, it will be seen that 404 is connected through contacts 512(3), now closed contacts 516(2) and contacts 520(2) to terminal 412 which (FIG. 5) may be connected by closure of switch 413 to terminal 414. The latter (FIG. 2C) is connected through diode 552 to energize relay 510. Following entry of the customer's account number the key 60 is depressed, closing the switch 413 and energizing the relay 510.

Contacts 510(3) now establish a holding circuit for relay 510 (from terminal 388) and simultaneously open the holding cricuit for relay 516, so that the former is effectively substituted for the latter in control function. Operations produced are so similar that they need not be described in detail and the following brief description will suffice:

Contacts 510(1) now serve to connect terminal 390 to terminals 292, 296 and 310 (as contrasted with 290 and 310).

Contacts 510(2) have no immediate function.

Contacts 510(4) fire the controlled rectifier by connecting its gate to energized terminal 414.

Contacts 510(5) connect the cathode of the controlled rectified 522 to the energizing terminal 126 of the nonadd solenoid 120, and through diode 574 to terminal 113 of add solenoid 109.

Contacts 510(6) are involved in read-out, performing the functions previously performed by contacts 516(6).

Energization of the add solenoid 109 starts, as before, the cycle of the printer which is the same as that previously described, terminating with the relay 510 energized instead of relay 516.

Energized terminal 292 lights through terminal 294 the lamps 440, 442, 444 and 454, and through 502(1), now deenergized, and terminal 296 the lamp 266. Lamp 264 is also illuminated. Lamp 266 illuminates the program key 64 calling for entry of the unit control number, while lamp 264 illuminates the merchandise key 62.

The unit control number is now entered in the appropriate colunms and the result of this is depression of switches 144 and 145. The former effects no result at this time. Terminal 417 is connected through diode 544 to the unit control relay 502.

The switch 145 connects terminals 418 and 420 but no result occurs because the circuit from terminal 418 through 510(2) runs to the open contact 404.

The operator must now depress the unit control key 64.

Depression of the unit control key closes the switch 410 which joins the terminals 415 and 417. The unit control key also closes the merchandise key switch 358 which connects terminals 356 and 360. (This last switch may also be closed by depression of the merchandise key alone.)

When switch 410 closes, positive terminal 402 is connected through switch 147 and through switch 410 to terminal 417, and unit control relay 502 is energized through diode 544. When relay 502 is energized a connection is provided from terminal 417 through 502(5), 494(4), 488(4), 486(4) and resistor 528 to the gate of the controlled rectifier 522 to cause firing. When relay 502 is enegrized, the opening of 502(4) deenergizes the relay 510. Relay 502 remains energized, current being delivered to its coil through contacts 486(1), 488(2), 494(2), 496(6), 498(4), 504(4) and 502(4).

Relay 502 remains energized, as does the controlled rectifier.

Operation of contacts 502(1), 502(2), 502(3) and 502(4) produce no substantial results. Contacts 502(5) fired the controlled rectifier. Contacts 502(6) connect the cathode of the controlled rectifier through various connections to initiate a cycle of the printer. The unit control number is printed, the non-add solenoid controlling operation.

At the end of the unit control cycle of the printer, unit control relay 502 remains energized, and the merchandise program key 62 is illuminated by lamp 264, which receives current at terminal 292 through a series of relay contacts including contacts 502(1). The unit control key is not illuminated because the circuit of lamp 266 is broken at contacts 502(1).

After the numerical merchandise entry is made, merchandise key 62 is depressed, closing switch 358. At this time, since the merchandise entry involves the depression of keys in the groups of columns 9-11, 7-8, 6 and 1-5, switches 143, 144, 145 and 147 will be in their lowered positions. Upon depression of the merchandise key, the item relay 504 will be energized, the energizing circuit being traceable through diode 540, terminal 416, switch 144, switch 143, terminal 360, merchandise switch 358, terminal 356, contacts 498(3) and 496(3), terminal 420, switch 145, terminal 418, contacts 496(2), 498(2), 502 (2), 512(3), terminal 404, switch 147, terminal 402, contacts 484(1) and 482(1) to terminal 390.

When relay 504 is energized, the holding circuit for relay 502 is broken by the opening of contacts 504(4), and relay 502 becomes deenergized. Relay 504 is held through its contacts 504(4) and contacts 502(3), now closed.

Contacts 504(5) provide a firing connection to the gate of the controlled rectifier.

Contacts 504(6) connect the controlled rectifier cathode through closed conections to energize various terminals including terminal 113 of the add solenoid 109.

The printer now goes through its cycle, and at the end of the cycle, relay 504 remains energized. Current is delivered through contacts 504(1), and various other contacts to terminals 292 and 296 to illuminate the merchandise and unit control keys respectively. Current is also delivered to terminals 298 and 302 to illuminate the subtotal and total lamps 268 and 274, respectively, the energizing circuit being traceable through contacts 504(3) (now closed), terminal 422, switches 143, 144, 145 and 147, terminal 402 and contacts 484(1) and 482(1) to terminal 390. There is now the option of operating any one of the illuminated keys.

Assuming, in a typical operation, that another item is sold, the unit control number will be entered, and the unit control key depressed to initiate a unit control cycle identical with that previously described and ending with relay 502 energized. This calls for a merchandise entry, and again the merchandise key will be depressed to complete a second merchandise entry, there being illuminated after each merchandise entry the same indications: unit control, merchandise, subtotal andtotal. This sequence may be produced indefinitely. If a unit control number is not involved, a merchandise entry may be made without unit control operation, the merchandise key being depressed. After each merchandise operation, the same four keys are lit.

After all of the items of merchandise involved in the complete transaction are entered, it may be assumed that there is a tax involved for which the operator may want to know the amount. In order to have this amount appear, the subtotal key 66 is depressed. This closes switch 334, and connects terminals 298 (now energized) and 336 through line 333. Subtotal relay 498 is now energized through diode 534, and is held through its contacts 498 (4). Contacts 498(4) remove holding current from item relay 504.

Terminal 336 is connected to the gate of the controlled rectifier through contacts 498(5), and subtotal solenoid 102 is energized by the delivery of current to terminal 112 through contacts 498(6). This initiates another cycle of the machine.

Contacts 498(2) now connect terminals 418 and 404, and contacts 498(3) connect terminal 420 to terminal 342. The miscellaneous/tax key and the employee discount/deposit key are illuminated by lamps 270 and 272 respectively, which receive current at terminal 300 through contacts 498(1). Lamps 450 and 454 are illuminated from terminal 300.

Assuming that a tax is to be entered at this time, the appropriate key in column six will be depressed, for example, the state tax key. The amount of the tax is entered in columns 1–5. When the miscellaneous/tax key is depressed, switch 344 closes, connecting terminals 342 and 406. Switches 145 and 147 are now in the downward position as a result of the depression of keys in columns 6 and 1–5. Miscellaneous relay 496 is now energized, its energizing circuit being traceable through diode 536, terminal 406, switch 344, terminal 342, contacts 498 (3), terminal 420, switch 145, terminal 418, contacts 496(2), and 498(2), contacts 512(3), terminal 404, switch 147 and terminal 402, which is now positive.

When relay 496 operates, contacts 496(1) maintain the energization of terminal 300 so that the miscellaneous/tax and employee discount/deposit keys remain lit. Contacts 496(2) maintain the connection between terminals 418 and 404, and contacts 496(3) maintain the connection between terminals 420 and 342. The total and subtotal lamps are lit through contacts 496(4) and terminals 302 and 298. Contacts 496(6) break the holding circuit for subtotal relay 498, and hold relay 496. Contacts 496(7) connect the relay energizing signal from terminal 406 to the gate of the controlled rectifier. Contacts 496(8) connect the cathode of the controlled rectifier to the junction of diodes 564 and 566 so that terminals 210, 214, 222, 226, 234 and 238 are energized. The energization of these terminals activates the individual switches associated with the out of state, repair, alteration, handling charge, state tax and Federal tax keys in column 6. If either the Federal tax key or the state tax key has been depressed terminal 114 of tax solenoid 103 will be energized through one of terminals 236 and 240. In the tax operation, the tax solenoid operates primarily to give the symbol. The tax solenoid operates through a linkage to produce adding, the add solenoid not being energized.

On the other hand, if any one of the keys including the out of state key, the repair key, the alteration key and the handling charge key, has been depressed, terminal 113 of the add solenoid 109 will be energized through one of terminals 212, 216, 224 and 228. In either of the above operations the amount will be added in the accumulator.

Lamp 270, associated with the miscellaneous/tax key remains illuminated so that it is possible to introduce any of the miscellaneous items in column 6 and the cycles may be repeated. The various charges will be added in the accumulator.

In the case of the deposit by the customer, however, there will be a substraction. The deposit situation is special, and in the case of a deposit, the deposit program key in column 6 should be depressed. This closes switch 196, and connects terminals 218 and 220. Terminal 218 is positive since contacts 496(1) are closed, and this positive voltage is applied through terminals 220 and diode 562 to energize relay 478 so that contacts 478(3) connect terminal 116 of subtract solenoid 104 through diode 566 and through various relay contacts to the cathode of the controlled rectifier. Since the employee discount/deposit key is depressed, 342 is connected to terminal 408, and the energization of relay 496 is maintained through terminal 408 and contacts 478(1). Relay 478 is held through contacts 478(2). Relay 520 is operated through diode 560 and is held through contacts 520(4). Contacts 520(3) connect a positive voltage to contacts 494(1).

Operation of the subtract solenoid causes the printing of a minus sign and directs the accumulator to subtract through a rack operation. Repeated operations of the miscellaneous and deposit type can be made. If a subtotal is desired at any point, for example to determine the tax after an employee's discount is entered, a subtotal could be obtained to form the basis for determining tax on a reduced amount.

When the transaction is completed, the total program key 72 is depressed in order to end the transaction and to issue a sales slip. Depression of the total program key closes switch 338, and connects terminal 302, which has been energized, to terminal 340. Relay 494 is energized from terminal 340 through diode 538. When relay 494 is energized, contact 494(2) remove holding current from relay 496, and reconnect current to the subtotal and total lamps through terminals 298 and 302. Contacts 494(3) are holding contacts. Contacts 494(4) connect terminal 340 to the gate of the controlled rectifier. Contacts 494(5) operate the total solenoid 101 by connecting the cathode of the controlled rectifier to terminal 110. Operation of the total solenoid results in reading of the accumulator and clearing of the accumulator only. The racks are not restored, but remain in their final condition. If a deposit has been entered, closure of contacts 494(1) delivers a positive signal to terminal 400, so that, when switch 138 closes at 20°, drawer-release solenoid 472 will operate.

A sales slip produced in accordance with the sequence previously described, is illustrated in FIG. 8. Duplicate copies of such a sales slip may be made as is usual in this type of printer. The sales slip forms have preprinted matter thereon which may vary widely from store to store and need not be specifically described since the legends in FIG. 8 will make clear what is involved.

The illustrated sales slip 700 has the feeding openings 702 by which it is advanced in operation.

The printed heading line is indicated at 704. This contains the date, the store number, the type of transaction, coded as 1, and the register number identifying the point-of-sale machine. The transaction number is printed from the counter already referred to which advances one step for each transaction. The sales person's number is printed as 122.

The customer's number is here shown as 3333 and is alone printed in the next line 706.

The next matter printed is the unit control number indicated as 2555 at 708. The next line 710 identifies the department, the class, the quantity of items (four) and the amount $3.44.

For another item of merchandise the unit control number and merchandise are indicated at 714 and 716.

At this point the clerk in order to ascertain the tax would require a subtotal, and this is indicated at 718, being identified by the letter S which is printed whenever the subtotal solenoid is actuated.

The next item is a state tax which appears in line 720. The fact that it is a state tax is indicated by the number 7 in column 6, and the legend Tx is printed on the slip.

The next line 722 shows a deposit, which is identified by the code number 3 in column 6 and its subtraction is indicated by the minus sign which is printed whenever a subtraction is involved.

The final line 724 shows the total, identified by the letter T.

The transmissions for the various items are identified by arrangements in the printer which need not be described. For example, the unit control number will be identified as such even though it is not identified in the printed matter of the sales slip.

Some other typical operations of the machine will now be described.

The operations of the machine during a typical cash transaction will now be described.

Initially, lamp 446 will be illuminated calling for an entry in column 11 of the type of transaction. The cash key is depressed, closing switch 166, which connects terminals 168 and 190. Terminal 168 connects to terminal 170 of switch 142 (now open), and terminal 190 connects through diode 590 to relay 520, which will be energized when switch 142 is closed at 20° in the machine cycle.

The employee's number lamp 456 is lit through switch 141, and the entry of the employee number in columns 1–5 is called for. Lamp 260, underneath the employee number program key 58, is energized also through switch 141.

When the employee number program key is depressed, switch 332 connects terminals 288 and 324, and the heading line relay 516 is energized through switch 146, which is now in its downward position because of the entry of the employee's number in columns 1–5.

Relay 516 is held through contacts 516(3), and the controlled rectifier is fired through contacts 516(4). The employee number solenoid 100 and the non-add solenoid 120 are simultaneously energized through contacts 516(5) and through terminals 106 and 126 respectively. A machine cycle is begun.

At 20° of the cycle, switch 142 closes, and relay 520 is energized through diode 590, terminal 190, switch 166, terminal 168, switch 142, terminal 172, and various relay contacts from terminal 388. Even though switch 142 opens before the end of the cycle, relay 520 remains energized through its holding circuit including contacts 524 which connect through diode 585 and contacts 494(2), 488(2), and 486(1) to terminal 388. The merchandise program key is illuminated by lamp 264, which is energized through terminal 292, contacts 520(1), and contacts 516(1). The unit control lamp 266 is energized, at this time through terminal 296.

The drawer-releasing solenoid 472 (FIG. 7) is set up by the closure of contacts 520(3), which will, when contacts 494(1) are closed, connect a positive voltage to terminal 400. Terminal 400 will be connected by switch 138 to the drawer-releasing solenoid through line 470.

At this time, relays 516 and 520 are energized and the unit control number and merchandise keys are illuminated. Entry of a unit control number or a merchandise entry may be made, and the resulting operations of the machine are identical with the corresponding operations taking place during a charge transaction.

The sub-total key will be illuminated by lamp 268, as in the charge transaction, when each merchandise entry cycle is completed since all keys will be up, and relay 504 will be energized. When the sub-total key is pressed, switch 334 closes, and sub-total relay 498 is energized through terminal 336. The sub-total solenoid 102 is energized through contacts 498(6), and the misc./tax, total, sub-total and empl./deposit keys will be illuminated. Various other entries may now be made as in the charge transaction.

When the total key 72 is depressed, switch 338 closes and causes total relay 494 to be energized through terminal 340. The total solenoid is operated through contacts 494(5), and, at 20° of the cycle thereby initiated, switch 138 closes and operates the drawer-release solenoid 472. Holding current is removed from the relays which were held by the opening of contacts 494(2), and the cash transaction is completed, the machine returning to its initial state.

It will be noted that the cash transaction is very similar to that of the charge transaction with the exception that entry of a customer's number is bypassed, and the cash drawer is open.

The C.O.D. transaction takes place in the same manner as the cash transaction just described, the only difference being that a different number is printed in the heading line for the type of transaction. Depression of the C.O.D. key in column 11 closes switch 164, which sets up the cash drawer relay 520 through terminal 188 rather than through terminal 190. In a C.O.D. transaction, a deposit may be required, and, during the transaction, after a subtotal solenoid 102 is energized, the deposit can be entered in columns 1–5 and the deposit key in column 6 will be depressed. Depression of the employee discount/deposit program key 70 results in the same operation as described for the charge transaction.

If the customer desires to pay, at the point of sale, an amount which is to be credited to his account, a payment on account transaction takes place, initiated by depression of the payment on account key in the eleventh column. Switch 162 closes, and connects terminal 168 (which will be energized at 20° during each cycle of the machine through switch 142) to terminal 186. Payment relay 518 will be energized during the first cycle of the machine through terminal 186 and diode 588, and will remain energized through a holding circuit including contacts 518(2). Contacts 518(1) connect a positive voltage to contacts 494(1) on the total relay, and then when these contacts close, the drawer-release solenoid 472 will be set up, and will be energized when switch 138 closes.

The type of transaction will be printed on the sales slip, as usual, at the same time as the employee's number is printed. The operation of the machine is similar to the operation which takes place during a charge transaction, the employee's number and customer's account number is being entered, and entry of unit control number and merchandise being indicated by illumination of program keys 62 and 64.

Following this, the amount of the payment is entered in columns 1–5, and a department number is entered in columns 9, 10 and 11. Keys in columns 6, 7 and 8 must also be depressed. Merchandise program key 62 is now depressed and the subtotal and total keys will be illuminated. When the total key is depressed, the drawer-release solenoid is operated through contacts 494(1) on the total relay and through switch 138, which operates at 20° during the final cycle.

If a no sale transaction, the issuance of a sales slip is effected, and a notation of the transaction is handwritten on the slip. The no sale key in column 11 is depressed in order to initiate operation of the machine in a transaction involving no charge, alterations, exchanges or the like in which no price is involved.

Closure of the no sale key in column 11 closes switch 158, which connects terminal 168 to terminal 182 in order to enable relay 492 to operate at 20° in the machine cycle.

The employee's number is called for in the usual manner, and during the cycle in which the employee's number is printed, relay 492 becomes energized, and is held through contacts 492(2). Contacts 492(1) connect the normally open contact at 482(4) through diode 532 to transmission cut-off relay 486.

During the first cycle, when the employee's number is printed on the sales slip, complete relay 482 operates, and when contacts 482(4) close, relay 486 is operated, and contacts 486(1) open and remove holding current from relay 492. Contacts 486(2) have no function at this time. Relay 486 is held through contacts 486(3), and through terminal 396 and switch 136 until 320° in the cycle. The controlled rectifier 522 is fired through contacts 486(4), and the cathode of the controlled rectifier is connected to the void solenoid 107 through contacts 486(5) and terminal 111.

When the complete relay 482 operates at the end of the first cycle, terminal 388 is connected through contacts 482(4) and 492(1) and through diode 532 to energize relay 486. The void solenoid 107 is operated through 486(5), and another cycle is begun immediately. Relay 486 remains energized through terminal 396 until switch 136 opens at 320° in the next cycle. Since contacts 486(1) are open, relay 492 is no longer held. Relay 516, which would normally be held at the end of the first cycle, is not held, since contacts 486(1) are open.

Operation of the void solenoid 107 initiates a second cycle during which "void" is printed on the second line, and the slip is issued. Since relay 486 is energized, the key control relay 484 cannot operate during the second cycle, and consequently, the start transmission relay 474 will not operate. This prevents the transmission of information to the central unit.

Ordinarily, at the end of each day, it is necessary to count the cash in the cash drawer. The key labeled "cash count" in the eleventh column is depressed, and the employee's number is called for in the usual manner by closure of switch 141. Terminal 180 will be energized through switch 156 at 20° in the cycle when switch 142 closes. At the end of the first cycle, during which the employee's number is printed, relay 490 is held through contacts 490(4). The number "4" identifying the cash count in the eleventh column is printed and transmitted to identify the transaction. Contacts 490(3) set up the add solenoid 109 through terminal 113. Contacts 490(2) set up the subtotal relay 498, and contacts 490 disconnect terminals 230, 218 and 242 from lamps 270 and 272 underneath the misc./tax and empl./deposit keys.

At the end of the first cycle, when contacts 482(3) on the complete relay close, subtotal relay 498 operates, and is held through contacts 498(4). Terminal 300 is energized through contacts 498(1), and the miscellaneous charge and amount lamps 450 and 454 on the panel are lit, and the misc./tax and empl./deposit program keys are illuminated.

The computer program now attaches a different significance to the keys in column 6. The other meanings are the following:

9 indicates change (coins).
8 indicates U.S. currency (bills).
7 indicates personal checks.
6 indicates store receipts, used in lieu of cash, i.e. issued for credit for returns.
5 indicates gift certificates.
4 is for miscellaneous matters, which may be explained in writing on the sales slip.

The remaining numbers are not used.

The cash drawer is, of course, opened by closure of switch 401.

When the amount of the bills in the cash drawer is determined, the key numbered 8 in column 6 is depressed, and the amount is entered in columns 1–5. Following this, the misc./tax program key is depressed, and this energizes terminal 406, and operates miscellaneous relay 496. Relay 496 is held through contacts 496(6), and holding current is removed simultaneously from relay 498. The total program key and the subtotal program key will now be illuminated. Further entries may be made with the depression of the appropriate key in column 6 and entry of the corresponding amount in columns 1-5 followed by depression of the misc./tax program key, which causes the amount to be printed. Depression of the total key terminates the operation and issues the sales check and a memorandum of the cash drawer account.

Both credit and cash can be given at the point of sale when an item is returned. If, for example, a customer returns a piece of merchandise, and desires cash in return, the cash credit key in column 11 is depressed. This closes switch 154, and sets up the cash drawer relay 520 through terminal 178 and diode 558. Ribbon shift solenoid 128 is also set up, at this time, through terminal 130 and diode 556. Entry of the employee's number is made in the usual manner, and the cycle ends with the merchandise program key and the unit control key illuminated in the same manner as in the cash transaction. The transaction proceeds in a manner similar to an ordinary cash transaction except that entry of the merchandise is ordinarily followed immediately by depression of the total key. The drawer release solenoid is operated.

If a customer desires to return goods and to have his account credited in the amount of the goods, the charge credit key in column 11 is depressed. This closes switch 152, which sets up the ribbon shift solenoid 128 through terminals 176 and 130, but which does not set up the cash drawer relay 520 because the signal is blocked by diode 556. The transaction proceeds in the same manner as an ordinary charge transaction, and the customer's account number is called for.

The testing of the customer's account number takes place in the central unit, and if the number entered does not meet the test applied to it, a signal appears at terminal 369. Near the end of the machine cycle, when access relay 506 is energized, the signal at terminal 369 causes relay 512 to be energized through contacts 506(1). Terminal 278 is energized through contacts 512(1), and lamp 252 is lighted through terminal 278, indicating that key 50 should be pressed. Key 50 is the wrong account number key, through which the transaction can be voided since it is not desirable to have anything incorrect on the customer's salescheck. Depression of key 50 closes switch 304, which energizes the transaction void relay 488, which causes the salescheck to be issued, and automatically returns the apparatus to its initial condition so that the salescheck can begin again by entering the type of transaction.

After the program calls for entry of a unit control number or merchandise, if a unit control number is entered, the central unit effects a test, and provides a signal at terminal 369 if the test is not met in a manner similar to the manner in which it provides a signal for an erroneous customer's account number. Relay 512 is energized similarly, but, at this time, lamp 256 is lit through terminal 282 and contacts 512(2). Lamp 256 illuminates wrong unit control number key 54, indicating that it should be depressed. Depression of key 54 does not place the machine in its initial condition, but rather causes its program to call for a new unit control number. Depression of key 54 closes switch 320, which energizes item relay 504 through terminal 322, which causes the machine to call for entry of unit control number or merchandise by illuminating lamps 264 and 266 beneath keys 62 and 64, respectively. It will be apparent that this operation prevents the lamp underneath the unit control number key 54 from being extinguished when a wrong unit control number is entered.

If the customer's account number is in the validating file because of a lost plate, bad credit, or for any other reason, a signal derived from the central unit appears at terminal 371. During the cycle, when contacts 506(2) close, authorization relay 514 is energized, and lamp 258 underneath key 56, is illuminated through contacts 514(1) and terminal 284. This illumination of authorization key 356 warns the salesclerk that she should call the accounting office to query the reason for the authorization request. If the clerk is satisfied, the authorization key may be depressed. This closes switch 326, which energizes terminal 414 in the same way as the customer's number key 60 energizes terminal 414. This operates the account number relay 512 in the normal manner, and the program calls for entry of the unit control number or merchandise in the normal manner.

If, however, the clerk fails to obtain authorization, the machine void key 52 can be depressed. This causes the transaction void relay 488 to be energized through terminal 306 by closure of switch 308, and further causes the transmission cut-off relay 486 to be energized through terminal 316 and switch 314.

Executive void key 48 is provided in order to void a completed previous transaction. This button should be pushed only by a department head or some other official and not by the clerk. Depression of key 48 closes switch 328, and energizes relay 508 through terminal 330. All of the first line information for the previous transaction to be voided is entered prior to depression of the executive void key, and all of this information is transmitted to the central unit.

Figure 9:
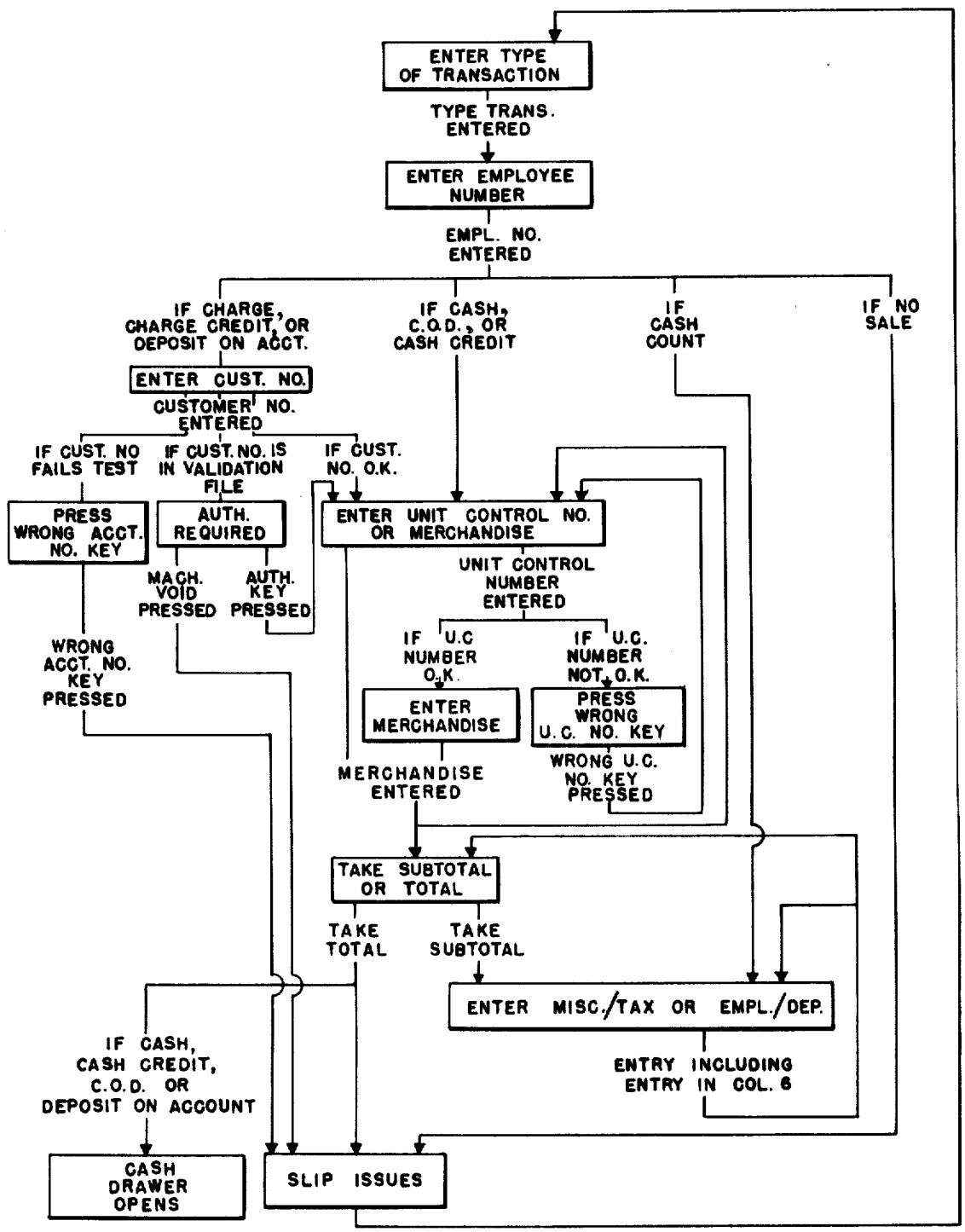
FIG. 9 is a flow-chart diagram illustrating the overall operation of the point-of-sale machine.

Referring to FIG. 9, which will serve to summarize the operations described above, the legends appearing in blocks indicate machine-given instructions, with the exception that the blocks marked "Cash Drawer Opens" and "Slip Issues" indicate machine operations. The legends, which do not appear in blocks indicate operations performed by the sales clerk or conditions affecting the sequence of operation.

The flow-chart is completely self-explanatory, but in order to illustrate the nature of the chart, the operations immediately following the point at which the machine instructs the operator either to enter a unit control number or to make a merchandise entry will be described.

The block marked "Enter Unit Control No. or merchandise" refers to a pair of instructions given by the machine through illumination of keys 62 and 64 (FIG. 1) and by the illumination of appropriate legends above the keyboard. Following these instructions, the sales clerk can either enter a unit control number or make a merchandise entry without a unit control number. If a unit control number is entered, it is checked in the central units, and if the unit control number is found to be satisfactory, the machine directs the entry of merchandise. If the unit control number is unsatisfactory, the machine directs the sales clerk to press the wrong unit control number key 54, which causes the machine to revert to the condition in which it calls for entry of the unit control number or merchandise.

Returning to the normal operation, it will be seen that merchandise may be entered either following the instruction to enter the unit control number or merchandise or following the instruction only to enter merchandise, a unit control number having been previously entered. After the merchandise entry is made, the sales clerk is directed to press the sub-total or total keys, but, if further items are to be sold in the same transaction, the sales clerk can enter a unit control number or merchandise or both, taking a subtotal or total only when the last item of merchandise is entered. The chart indicates that, after the firs item of merchandise is entered, the machine calls for the taking of a subtotal or total or the entry of a unit control number or merchandise.

The remainder of the flow chart is consistent with the above description, and need not be described.

It will be apparent that various modifications can be made to the invention described herein without departing from its scope as defined in the following claims.

We claim:

1. Apparatus for recording transactions in which entries of data are made in sequential steps comprising
 a keyboard made up of an array of keys each of which is selectable for the entry of information in more than one step of a transaction, means for effecting recording of information entered in said keyboard, programming means for sequentially identifying classes of information to be entered in said keyboard, and means controlled by the operation of keys in said keyboard in one of said steps for controlling the sequence of identification by said programming means in subsequent steps of a transaction.

2. Apparatus according to claim 1 in which said means for effecting recording of information includes means for printing said information on a sales slip.

3. Apparatus for recording transactions in which entries of data are made in sequential steps comprising a keyboard made up of an array of keys each of which is selectable for the entry of information in more than one step of a transaction, means for effecting recording of information entered in said keyboard, programming means for sequentially identifying groups of keys in said array which may be operated in a step, and means controlled by the operation of keys in said keyboard in one of said steps for controlling the sequence of identification by said programming means in subsequent steps of a transaction.

4. Apparatus for recording transactions in which entries of data are made in sequential steps comprising a keyboard made up of an array of keys each of which is selectable for the entry of information in more than one step of a transaction, a plurality of manipulable means for effecting recording of information entered in said keyboard, programming means for identifying manipulable means which may be operated in a step, and means controlled by the operation of keys in said keyboard in one of said steps for controlling the sequence of identification by said programming means in subsequent steps of a transaction.

5. Apparatus according to claim 4 in which said manipulable means include keys having legend, and in which said programming means includes means for selectively illuminating said legends to indicate the classes of information to be entered through the array of keys.

6. Apparatus for recording transactions in which entries of data are made in sequential steps comprising a keyboard comprising a plurality of columns of keys, the keys in each column being selectable for the entry of information in more than one step of a transaction, means for effecting recording of information entered in said keyboard, programming means for sequentially identifying classes of information to be entered in said keyboard, and means controlled by the operation of keys in a column of said keyboard in one of said steps for controlling the sequence of identification by said programming means in subsequent steps of a transaction.

7. Apparatus for recording transactions in which entries of data are made in sequential steps comprising a keyboard comprising a plurality of columns of keys, the keys in each column being selectable for the entry of information in more than one step of a transaction, means for effecting recording of information entered in said keyboard, programming means for sequentially identifying columns of keys in said array which may be operated in a step, and means controlled by the operation of keys in a column of said keyboard in one of said steps for controlling the sequence of identification by said programming means in subsequent steps of a transaction.

8. Apparatus according to claim 7 in which said programming means includes a display panel having a plurality of selectively illuminable areas each aligned with at least one of said columns, and means for illuminating said areas to identify the columns of keys which may be operated.

9. Apparatus for recording sales transactions in which entries of data are made in sequential steps comprising a keyboard made up of an array of keys each of which is selectable in more than one step of a transaction for the entry of information, means for effecting recording of information entered in said keyboard, a cash drawer, and control means responsive to the entry of certain predetermined information in said keyboard in one of said steps for effecting opening of said cash drawer, while preventing opening of the cash drawer when other information has been entered in said keyboard.

10. Apparatus for recording transactions in which entries of data are made in sequential steps comprising a keyboard made up of an array of keys each of which is selectable for the entry of information in more than one step of a transaction, means for effecting recording of information entered in said keyboard, programming means for sequentially identifying classes of information to be entered in said keyboard, a cash drawer, and means controlled by the operation of keys in said keyboard in one of said steps for controlling the sequence of identification by said programming means in subsequent steps of a transaction, and for effecting opening of said cash drawer when predetermined information has been entered in said keyboard in said one of said steps.

11. Apparatus for recording transactions in which entries of data are made in sequential steps comprising a keyboard made up of an array of keys each of which is selectable in more than one step of a transaction for the entry of information, means for effecting recording of information entered in said keyboard, means for accumulating numerical entries made through keys in said array in at least one step of the transaction, and control means in part responsive to the operation of one key in said array in at least one but not all of the steps in which entries are made in the keyboard for effecting addition in said accumulating means of a numerical entry made in the same step and in part responsive to the operation of another key in said array in at least one but not all of the steps in which entries are made in the keyboard for effecting subtraction in said accumulating means of the numerical entry made in the same step.

References Cited

UNITED STATES PATENTS

| 3,372,379 | 3/1968 | Collom et al. | 340—172.5 |
| 3,351,912 | 11/1967 | Collom et al. | 340—172.5 |
| 3,335,407 | 8/1967 | Lange et al. | 340—172.5 |
| 3,296,596 | 1/1967 | Yagusic et al. | 340—172.5 |

GARETH D. SHAW, Primary Examiner

Disclaimer 3,541,526.—*Oscar C. Levy*, Pikesville, and *George A. Groth*, Fallston, Md. APPARATUS FOR RECORDING SALES AND THE LIKE. Patent dated Nov. 17, 1970. Disclaimer filed Mar. 18, 1974, by the assignee, *American Totalisator Company, Inc.*

Hereby enters this disclaimer to all claims of said patent.

[*Official Gazette November 19, 1974.*]